(12) United States Patent
O'Rourke et al.

(10) Patent No.: US 6,212,574 B1
(45) Date of Patent: Apr. 3, 2001

(54) USER MODE PROXY OF KERNEL MODE OPERATIONS IN A COMPUTER OPERATING SYSTEM

(75) Inventors: Thomas J. O'Rourke, Oulu (FI); George H. J. Shaw, Woodinville; Bryan A. Woodruff, New Bend, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/825,855

(22) Filed: Apr. 4, 1997

(51) Int. Cl.[7] ........................................... G06F 9/54
(52) U.S. Cl. ................................................. 709/321
(58) Field of Search ................................ 709/301, 304, 709/300, 319, 321, 322, 323, 324, 325, 326, 327, 310; 713/400; 707/104; 345/978

(56) References Cited

U.S. PATENT DOCUMENTS

| | | | |
|---|---|---|---|
| 5,642,171 | * | 6/1997 | Baumgartner et al. ............... 348/515 |
| 5,727,212 | * | 3/1998 | Dinallo .................................. 395/681 |
| 5,793,961 | * | 8/1998 | Marisetty et al. ................. 395/200.8 |

OTHER PUBLICATIONS (Coulson) "Supporting Continuous Media Applications in a Micro–Kernel Environment". Geoff Coulson et al., 1994.*

* cited by examiner

Primary Examiner—Majid A. Banankhah
Assistant Examiner—Lewis A. Bullock, Jr.
(74) Attorney, Agent, or Firm—Workman, Nydegger & Seeley

(57) ABSTRACT

This invention involves user mode proxy of kernel mode operations in a computer operating system. The broad contours of the invention allow drivers operating in the kernel mode of an operating system to be proxied by a corresponding user mode object. A user mode process wishing to communicate with or manipulate the kernel mode driver may perform such communication or manipulation by communicating with or manipulating the corresponding user mode proxy. The present invention has particular applicability to emerging operating systems which allow kernel mode drivers to be interconnected in order to create a processing stream in the kernel where data is passed from kernel mode driver to kernel mode driver without transitioning to user mode. User mode proxy of such kernel mode drivers allows user mode processes to manipulate such kernel mode drivers using familiar user mode protocols without the necessity of learning new kernel mode protocols.

18 Claims, 9 Drawing Sheets

USER MODE PROXY OF KERNEL MODE OPERATIONS IN A COMPUTER OPERATING SYSTEM

BACKGROUND OF THE INVENTION

1. The Field of the Invention

The present invention relates to the interaction between software components in the user mode of a computer operating system and software components in the kernel mode of a computer operating system. More specifically, the present invention relates to the proxy of software components in the kernel mode of a computer operating system by software components in the user mode of a computer operating system.

2. The Prior State of the Art

Although computers were once a rather obscure oddity used primarily by scientists, today computers have become an integral part of mainstream society. Almost daily, computers are changing the way that many people live, work, and play. The widespread proliferation of computers has opened up vast new uses and applications that were unheard of only a few short years before. Today, computers are not only a powerful tool used by many businesses, but also a source of recreation and enjoyment for millions.

As computers have evolved and have been applied to an ever increasing array of uses, they have also become more powerful, and sophisticated. Computers today have complex operating systems that provide a robust environment for various application programs and intuitive user interfaces. Such operating systems normally have different operational levels or "modes," depending on the level of sophistication of the operating system and the security features that are implemented by the operating system. For example, normal application programs typically run at the lowest priority and have a full complement of security devices in place to prohibit interference with other applications, or with other layers of the operating system. Hardware and other services provided by the operating system are only accessed through controlled interfaces or mechanisms which limit the ability of a single user application to "crash" the system. This lowest priority mode is generally referred to as "user" mode and is the mode that most computer users are familiar with.

In operating systems that provide more than one layer or mode, applications are typically not permitted to directly access computer hardware. The operating system, rather, provides interfaces through which an application program in user mode may access hardware or other services provided by the operating system. Thus, a layer of software typically exists on top of computer hardware in the system. This layer of software is typically referred to as a driver or filter.

Software drivers are normally built to control hardware and provide an interface that can be used to control or access the hardware. Drivers are typically very closely linked to the hardware components they control. For this reason, it is generally desirable to allow drivers to run in a mode with very little overhead. When drivers interface with hardware, they also typically perform many time critical functions. For example, when a driver writes data onto a mass storage device, the driver must ensure that the mass storage device always has sufficient data available to permit the data to be written to the mass storage device without large delays.

Because of the close integration of drivers with their associated hardware and because of the time critical nature of the tasks that many drivers perform, drivers typically run in an operating system mode that has a much higher priority and much lower security protection. This mode is generally referred to as "kernel" mode. Because of the few security protections available in kernel mode, software components running in kernel mode are typically restricted to the most trusted software components. Such software components typically must be thoroughly tested and behave in ways that are absolutely predictable.

Because the general concept of a software driver contemplates controlling specific hardware or providing specific services to user mode applications, drivers are normally developed in isolation from one another and provided by a hardware manufacturer or an operating system provider. For example, software drivers providing a particular type of I/O service associated with an add-in hardware card through a device interface need not communicate with, nor know the existence of, any other driver.

As previously discussed, today, computers are not only a powerful tool used by many businesses, but also a source of recreation and enjoyment for millions. One application area that has been opened up by newer, more powerful personal computers, has been the area of multimedia. Multimedia typically requires processing a stream of data using a sequence of processing functions. The data typically consists of digital samples representing sound or video, and the processing blocks or "filters" may include decompression processing for compressed data, special effects processing, transforms, scaling, rendering processing to convert digital data into analog signals, etc. Processing architectures which connect a series of different filters, each performing a particular function on a given item of data before passing the item of data onto another filter, are typically referred to as streaming architectures. The connected sequence of filters is sometimes referred to as a filter graph.

Referring now to FIG. 1, an example system is presented for rendering a stream of sound data from a disk drive so that it may be heard through the speaker according to a prior art model. An amount of data is stored on disk 20, representing sound in the form of digitized samples. Alternatively, the source of the sound data stream may be digitized information coming from a phone line, digitized information from a network, or other communication packets or sources known in the art.

A kernel mode disk driver 22, retrieves data from disk 20 under the control of a user mode reader process 24. Reader process 24 will interact with disk driver 22 using a standard I/O control interface of the operating system and will cause the compressed sound data to be read from disk 20. As data is retrieved from disk 20, it is typically placed in buffers allocated in user mode as part of the user mode address space.

When data is retrieved from disk 20 as described above, reader 24 passes the data to decompressor 28, which will decompress the data and prepare the data for further processing. In the example illustrated in FIG. 1, this step is performed entirely in user mode. This subjects the decompression step to the lower priority processing of user mode and also provides the safety mechanisms attendant with user mode execution.

After decompressor 28 has decompressed the data, the data is passed to effects component 30 will operate on the data to provide some special effect. In the example illustrated in FIG. 1, effects component 30 has an accompanying effects filter 32 operating in kernel mode. Furthermore, effects filter 32 may utilize effects processor 34 or may perform the desired processing entirely in software. In order to access effects filter 32, effects component 30 will use the system I/O control mechanism to transfer data and control to effects filter 32. This results in a kernel mode/user mode boundary transition in order to utilize effects filter 32. Effects filter 32 will utilize effects processor 34 as appropriate for the function and data presented.

After control and data is transferred from effects filter 32 back to effects component 30, the data is transferred to sound rendering block 36. Sound rendering block 36 will transfer control and data to sound rendering driver 38. This causes another mode transition as the kernel mode/user mode boundary is crossed. Sound rendering driver 38 in turn controls sound card 40 in order to render the data, as processed and filtered, as sound through speaker 42.

Operation of the filter graph including reader 24, decompressor 28, effects component 30, and sound rendering block 36 may be under the control or direction of a client or controlling process. In FIG. 1, such a controlling process is illustrated by controlling agent 26. Controlling agent 26 manages the different components in order to effectuate the rendering of sound data. Controlling agent 26 may include dynamic graph building in order to construct the filter graph illustrated in FIG. 1. Such a dynamic graph building capability may allocate software components dynamically in order to provide custom filtering or dynamic rearranging of processing paths as designated by an end user.

Several observations can be made regarding the prior art model of FIG. 1. First, the filter graph is constructed and executes largely or wholly within user mode. While such a mode provides robust error checking and security, the low priority of execution in user mode and the attendant delays may cause problems. For example, when rendering audio or video data, it is generally highly desirable to play the music or video at a constant or nearly constant speed. This requires careful attention to the delays encountered in user mode. Significant efforts have been expended in prior art models to ensure a steady and even flow of data through a user mode filter graph. However, problems still exist and there is much room for improvement. It would, therefore, be highly desirable to provide uniform rendering of a data stream without concern for the low priority execution and attendant delays of user mode.

Another observation that can be made from the architecture presented in FIG. 1, is that the rendering of data may require a number of mode transitions. Since each mode transition introduces an element of delay and requires orchestration by the operating system, it would be highly desirable to minimize or eliminate mode transitions while not sacrificing the higher priority execution that occurs in kernel mode. Presently, no technology exists that allows these goals to be achieved. Furthermore, it would be highly desirable to allow all these capabilities to be met while not sacrificing the ability of a controlling agent operating in user mode to quickly and effectively configure filter graphs to achieve a desired sequence of processing.

SUMMARY AND OBJECTS OF THE INVENTION

The foregoing problems in the prior state of the art have been successfully overcome by the present invention, which is directed to user mode proxy of kernel mode operations. The present invention is presently intended for use with an operating system that implements a streaming architecture in the kernel mode. Such an architecture will allow various kernel mode drivers or filters to be connected within the kernel mode so that data can be passed from one driver or filter to another without passing through user mode. Such an architecture minimizes the number of kernel transitions and reduces inefficiencies and overhead in a filter graph. However, such an architecture may require significant modifications to existing controlling agents which control and configure filter graphs. The present invention forms a software layer on top of a kernel mode graph and allows a controlling agent to manipulate a particular kernel mode filter by manipulating a user mode proxy of that particular kernel mode filter.

In one aspect of the present invention, a generic proxy filter is defined. Such a generic proxy filter may serve as a proxy for a wide variety of kernel mode filters or drivers. The generic proxy filter includes functionality to support kernel mode filters useful in processing multimedia data. However, the capabilities of such a generic object may be extended or a separate generic object used for other classes of kernel mode drivers or filters. The process of obtaining a new copy of a generic proxy filter and connecting the generic proxy filter to a particular kernel mode filter causes the generic proxy filter to be reconfigured and adapted to work specifically with the connected kernel mode filter.

For situations where the inherent capabilities of the generic proxy filter are incapable of successfully allowing a controlling agent to access the underlying capabilities of a particular kernel mode filter, mechanisms have been established to extend the capabilities of the generic proxy filter. In one aspect, a generic proxy filter can be extended by incorporating extensions into the generic proxy filter. In one embodiment, the generic proxy filter has a plurality of predefined "hook points." The provider of a particular kernel mode driver may also provide one or more extensions to be connected at one or more of the predefined hook points. When such an extension is incorporated into the generic proxy filter, the proxy filter will execute the code provided in the extension instead of the executable code provided in the generic proxy filter. In this manner, providers of kernel mode drivers can override the behavior of the generic proxy filter at any one of the hook points. In this manner, developers of kernel mode drivers can extend the capabilities of the generic proxy filter without the necessity of rewriting the generic proxy filter. A provider of a kernel mode driver may simply provide the kernel mode driver and any appropriate extensions to the generic proxy filter. Incorporation of extensions into a proxy filter is accomplished at run time in some embodiments. Thus, the proxy filter is binarily extensible.

In addition to extending the capabilities of the generic proxy filter at predefined hook points, the generic proxy filter may be extended in a number of other ways. The generic proxy object can also incorporate extensions that perform translation functions. For example, it may be necessary to translate an interface for passing a data stream from a user mode filter into a kernel mode filter and visa versa. There also currently exist a number of standard controls that are adapted to provide specific types of control functions such as volume setting, tone setting, brightness controls, and any number of other types of controls applicable and useful in audio and video processing. The generic proxy filter is capable of incorporating any number of the standard controls into itself during the configuration process. Thus, if the provider of a kernel mode driver constructs the driver to be compatible with a standard control, such a control can be provided with no extra effort on the part of the provider. In the alternative, a kernel mode filter provider may wish to provide a custom control that may be incorporated into the proxy filter.

Often it is desirable to allow a user to set certain parameters such as volume, brightness, etc., of a kernel mode filter.

To achieve such a capability, it is generally necessary to provide a user interface component that allows a user to enter data which is then used to set various parameters in the kernel mode filter. The generic proxy filter of the present invention incorporates the ability to ask each control incorporated into it what user interface should be used to collect data from a user. The generic proxy object then incorporates the identified user interfaces so that a user can set the appropriate parameters using the identified user interfaces.

Once the generic user mode proxy filters have been configured and connected to particular kernel mode filters, a controlling agent can interconnect kernel mode filters simply by interconnecting the corresponding user mode proxy filters. This provides a significant advantage in that controlling agents need not be modified to specifically work with kernel mode filters. User mode proxy filters can deal with a controlling agent using a familiar protocol and then translate requests from a controlling agent into the appropriate protocol for the kernel mode filters.

In addition to configuring itself initially, generic proxy filters can be adapted to reconfigure themselves as the underlying kernel mode filter changes. The ability to dynamically reconfigure itself may be particularly important in embodiments where the underlying kernel mode filter can dynamically change configurations.

Another significant advantage of the present invention is the ability to quickly and easily synchronize two processing streams where one exists wholly or partially in user mode and the other wholly or partially in kernel mode. When a filter graph processes a stream of time sensitive data, such as is the case for audio or video data, care must be taken to ensure that the data is played at the proper rate. This generally requires that each processing module have access to time information so that processing can be accelerated or slowed down to keep the data playing at the proper rate. When two processing streams must be synchronized, as is the case when a video clip has an accompanying audio stream, then two filter graphs must be synchronized in order to keep the two data streams synchronized. In such a situation, if both filter graphs reside in user mode, then a single user mode clock can be used for both processing streams.

With the advent of streaming architectures in kernel mode, situations can arise where two filter graphs exist with one filter graph existing in kernel mode and another filter graph existing in user mode. Thus, there is a need for the capability to synchronize two processing streams when one exists in user mode and the other exists in kernel mode. The present invention provides the ability to synchronize such processing streams. In one aspect, a user mode clock is defined for the user mode filter graph and a kernel mode clock is defined for the kernel mode filter graph. One clock is selected to be the master clock, and the other clock is selected to be the slave clock. The slave clock is then slaved or synchronized to the master clock. Using such an architecture, the two processing streams may be synchronized.

When a kernel mode clock is selected as the master clock, the present invention achieves synchronization by defining a user mode proxy for the kernel mode clock. The user mode proxy clock retrieves time information from the kernel mode clock and provides the time information to user mode filters. Kernel mode filters directly obtain time information from the master kernel mode clock.

When the user mode clock is selected as the master clock, the situation becomes a little more complicated. In such a situation, a user mode "forwarder" is defined. The user mode forwarder retrieves time from the master user mode clock and forwards the time information to a kernel mode slave clock. Thus, the forwarder acts as a type of user mode proxy for the kernel mode slave clock. Alternatively, in such a configuration the kernel mode slave clock can be thought of as a kernel mode proxy of a user mode master clock. User mode filters can retrieve time information from either the master clock or from the forwarder, depending on the particular implementation details. Kernel mode filters retrieve time information from the kernel mode slave clock.

Accordingly, it is a primary object of this invention to provide user mode proxies for kernel mode filters. Other objects of the present invention include: providing a way for controlling agents operating in user mode to quickly and easily interconnect kernel mode filters by manipulating user mode proxies; providing a generic proxy object that may be used for virtually all kernel mode filters either unchanged or through various extension mechanisms; and providing mechanisms to synchronize processing streams where one processing stream exists primarily or wholly in user mode, and the other processing stream exists primarily or wholly in kernel mode.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

1. Terminology

Figure 1:
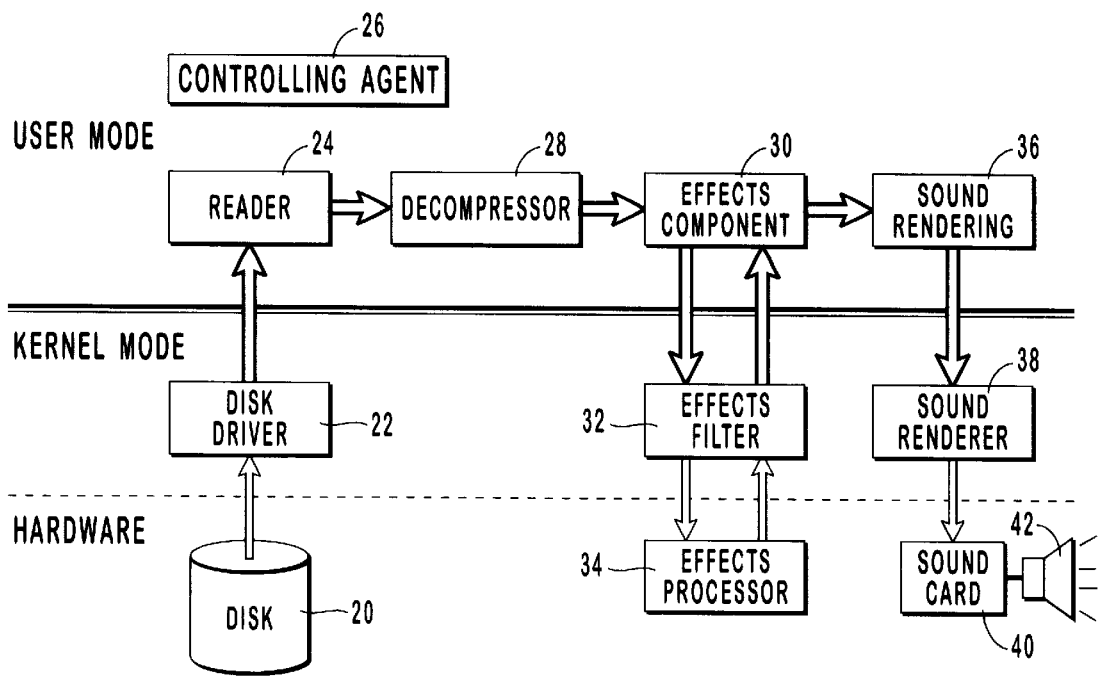
FIG. 1 is a diagram illustrating a prior art user mode filter graph for processing audio data.

As used herein, the term "user mode" refers to a level of operation in an operating system where most user written programs run. The user mode level of operation is typically the most secure level and has a significant amount of overhead to prevent one application program or process from interfering with another application program or process. Furthermore, access to system resources is highly controlled through specific interfaces and run priority is generally one of the lowest, if not the lowest.

As used herein, the term "kernel mode" refers to a level of operation in an operating system having significantly less restrictions than the user mode level of operation. Examples of kernel mode programs or processes would include software drivers for controlling hardware components. Typically, kernel mode programs are performance sensitive, and therefore, have less operational overhead than user mode programs. Furthermore, access to hardware and many system resources is unrestricted or much less restricted than for user mode programs. In many instances, program code running in kernel mode relies on programmer discipline and conformity to convention in order to establish good system behavior (e.g., not disrupting another program's address space, etc.).

As used herein the term "driver" refers to software driver programs typically running in kernel mode. The term driver may also refer to the actual executable program that is loaded onto the operating system or a portion thereof that imparts certain functionality. Drivers are in many instances, though not necessarily, associated with some form of hardware.

As used herein, the term "filter" refers to a portion of the functionality found within a software driver, including the entire driver itself. For example, a software driver may support a number of different filters of may have one single function. Also, in a more generic sense, the term filter may refer to the operation performed, such as decompression, etc., regardless of whether that occurs in a software driver filter running in kernel mode or another piece of program code running in user mode.

2. Operating Environment

The following invention is described by using diagrams to illustrate either the structure or processing of one or more embodiments used to implement the present invention. Using the diagrams in this manner to present the invention should not be construed as limiting of its scope. The present invention contemplates both methods and systems for user mode proxy of kernel mode operations. Embodiments of the present invention may comprise a general purpose computer with software used to implement the present invention. A special purpose or dedicated computer may also be used to implement the present invention and should be included within the scope of this invention.

Special purpose or general purpose computers used in the present invention may comprise standard computer hardware such as a central processing unit (CPU) or other processing means for executing computer executable instructions, computer readable media having executable instructions, a display or other output means for displaying output information, a keyboard or other input means for inputting information, and so forth. Operating environments for the present invention may comprise any number of operating systems that have a user mode and a kernel mode, or equivalent thereof, and are further adapted to allow interconnection of multiple kernel mode filters or drivers as explained below. Two presently preferred operating environments for the present invention include the Microsoft Windows® or the Microsoft Windows NT® operating systems.

Embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, at least instructions and possibly data which cause a general purpose computer, special purpose computer, or special purpose processing device to perform a certain function or a group of functions.

3. Invention Context

As previously discussed in the background section, FIG. 1 represents a filter graph adapted for processing a stream of audio data configured and implemented according to principles and architectures of the prior art. To review briefly, reader 24, decompressor 28, effects component 30, and sound rendering block 36 form a series of user mode filters connected together in a filter graph as illustrated. Controlling agent 26 coordinates and controls operation of the filter graph. Audio data is retrieved from disk 20 via disk driver 22 under the control of reader 24. Reader 24 passes the data to decompressor 28, which decompresses the data and passes it to effects component 30. Effects component 30 uses effects filter 32, and effects filter 32 may use effects processor 34 to process the data and implement certain effects. After processing, effects component 30 passes the data to sound rendering block 36 for rendering. Sound rendering block 36 passes the data to sound rendering driver 38, which forwards the data to sound card 40 where it is rendered and played on speaker 42.

Figure 2:
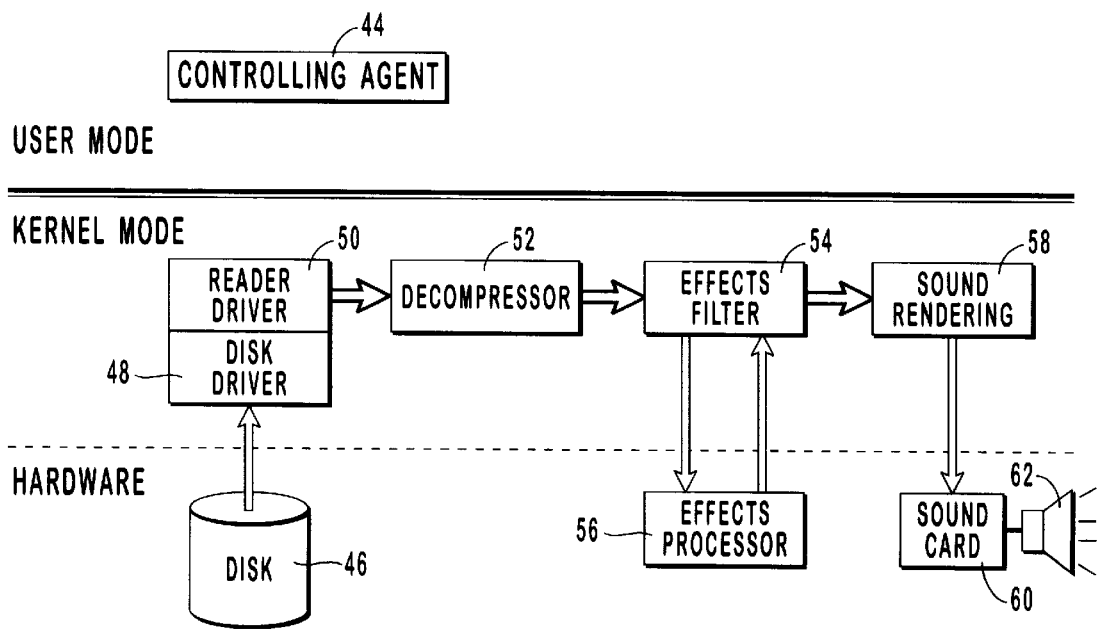
FIG. 2 is a diagram illustrating a kernel mode filter graph for processing audio data.

FIG. 2 presents a filter graph that performs the same functions as the filter graph of FIG. 1 but is implemented entirely in kernel mode. Such a filter graph can be constructed from kernel mode filters in an operating system that supports interconnection of such filters in the kernel mode. It is presently anticipated that future versions of Microsoft Windows NT® will incorporate such a capability. Various details of such architectures can be found in several co-pending applications. Details of how kernel mode filters can be interconnected can be found in co-pending U.S. patent application Ser. No. 08/825,856 entitled METHOD AND COMPUTER PROGRAM PRODUCT FOR INTERCONNECTING SOFTWARE DRIVERS IN KERNEL MODE (hereinafter the "Interconnecting Kernel Mode Drivers" application), filed in the name of George H. J. Shaw, Bryan A. Woodruff, and Thomas J. O'Rourke, which is incorporated herein by reference. U.S. Pat. No. 6,016,515 issued Jan. 18, 2000, entitled METHOD, COMPUTER PROGRAM PRODUCT, AND DATA STRUCTURE FOR VALIDATING CREATION OF AND ROUTING MES- SAGES TO FILE OBJECTS (hereinafter the "Message Routing" application), filed in the name of George H. J. Shaw and Bryan A. Woodruff discusses how messages are routed to various kernel mode filters and how such messages are handled. This application is also incorporated herein by reference. U.S. Pat. No. 5,815,689, issued Sep. 29, 1998, entitled METHOD AND COMPUTER PROGRAM PRODUCT FOR SYNCHRONIZING THE PROCESSING OF MULTIPLE DATA STREAMS AND MATCHING DISPARATE PROCESSING RATES USING A STANDARDIZED CLOCK MECHANISM (hereinafter the "Synchronization" application), filed in the name of George H. J. Shaw, Bryan A. Woodruff and Thomas J. O'Rourke, discusses how multiple kernel mode processing streams may be synchronized and how the processing rate of filters within a filter graph may be matched. This application is incorporated by reference. Co-pending U.S. patent application Ser. No. 08/825,957, entitled METHOD AND COMPUTER PROGRAM PRODUCT FOR REDUCING INTER-BUFFER DATA TRANSFERS BETWEEN SEPARATE PROCESSING COMPONENTS (hereinafter "Interbuffer Transfer" application), filed in the name of George H. J. Shaw, Bryan A. Woodruff, and Thomas J. O'Rourke discloses how memory is allocated between filters in a filter graph in order to allow efficient processing and data transfer between interconnected filters. This patent application is also incorporated herein by reference.

Returning now to FIG. 2, according to the architecture disclosed in the above co-pending patent applications, controlling agent 44 will query the drivers in order to identify data formats and connection formats in order to interconnect kernel mode filters to create a filter graph such as that illustrated in FIG. 2 where processing takes place entirely within the kernel. Controlling agent 44 will also receive notification of important events so that it may exercise control as necessary. Examples of such events would include end of processing, a data starvation situation, a data overrun situation, and so forth.

In FIG. 2, sound data is read from disk 46 by disk driver 48. This process occurs under the control of reader driver 50. Reader driver 50 passes the data to connected decompressor 52. As before, after decompression the data is forwarded to effects filter 54. Effects filter 54 will apply effects using effects processor 56 as appropriate and pass the data to sound rendering driver 58. Sound rendering driver 58 controls sound card 60 so that the audio data is rendered as sound and played from speaker 62.

A comparison of the processing illustrated in FIGS. 1 and 2 illustrates that equivalent processing is performed by the architecture in FIG. 2 with much less overhead due to the elimination of kernel transitions. Furthermore, as explained in the co-pending applications previously incorporated by reference, significant effort has been expended in eliminating other inefficiencies such as unnecessary data movement between buffers allocated by various kernel mode filters. When combined with the inherent performance increase that is achieved by processes running in kernel mode, these improvements combine to create a highly efficient filter graph with capabilities well beyond any current technology.

Such improvements, however, come at a price. For example, since controlling agent 44 will be dealing with kernel mode filters rather than user mode filters as illustrated in FIG. 1, controlling agent 44 must usually be modified to include awareness of how to deal with the protocols and information used to create a filter graph using kernel mode filters. This may entail significant effort due to both the time and energy that must be expended to understand the new protocols used by kernel mode filters, and from the time and energy needed to modify existing controlling agents or create new controlling agents to take advantage of the new capabilities. It would be highly desirable to allow programmers and controlling agents that understand existing user mode filters to be able to leverage that knowledge to reduce the amount of learning and effort needed to take advantage of the increased capabilities offered by such architectures. The present invention is designed to achieve these results without sacrificing any of the benefits or advantages of the new architecture.

4. Invention Description

Figure 3:
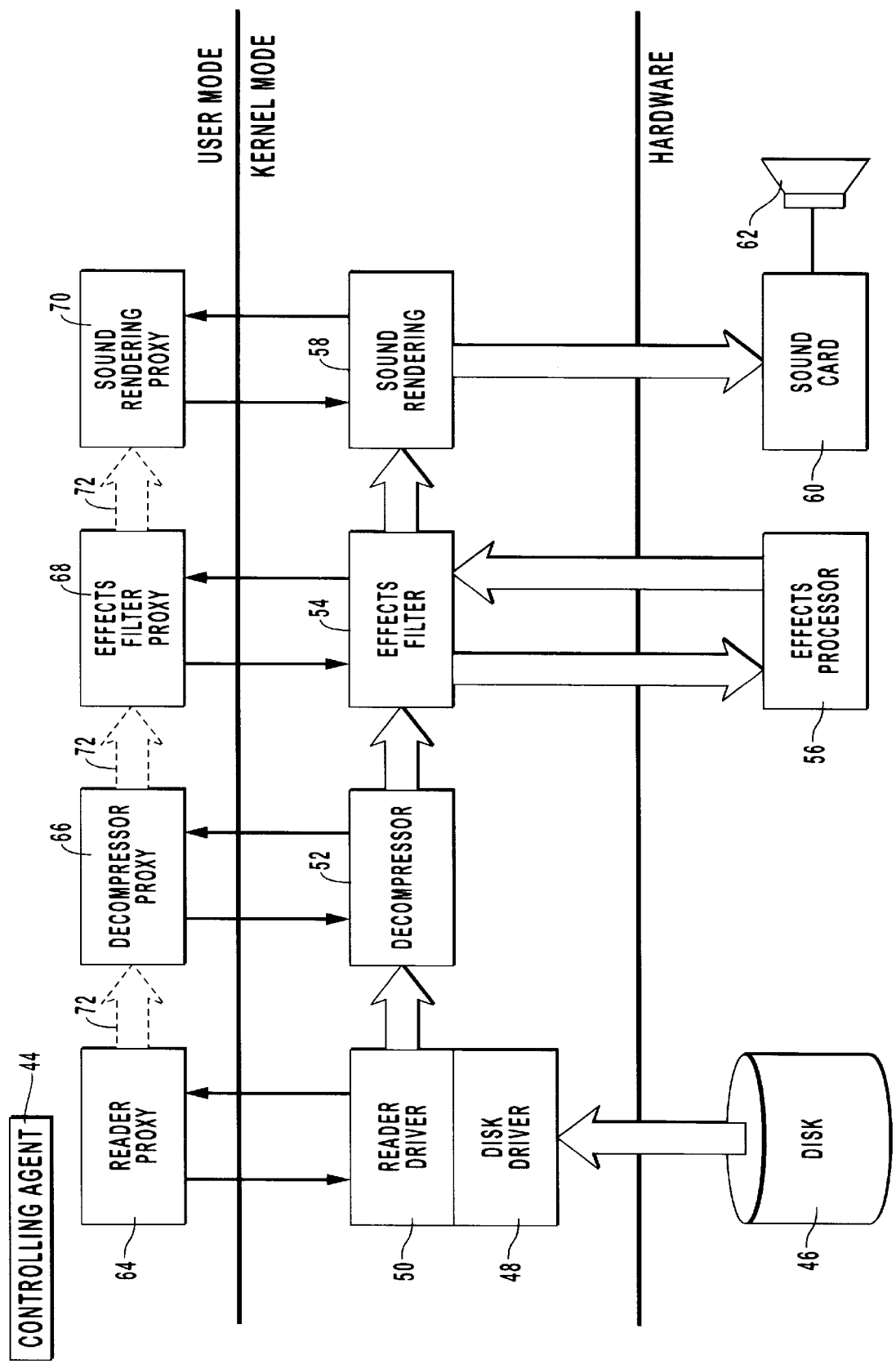
FIG. 3 is a diagram illustrating an example filter graph incorporating user mode proxy filters for kernel mode filters.

Referring next to FIG. 3, a diagram illustrating the filter graph of FIG. 2 with the principles of the present invention incorporated is presented. As illustrated in FIG. 3, the only difference between a filter graph implemented according to the present invention and a filter graph implemented as illustrated in FIG. 2 is the addition of proxy filters for each of the kernel mode filters. In FIG. 3, these proxy filters are illustrated by reader proxy filter 64 which acts as a proxy for reader driver 50, decompressor proxy filter 66 which acts as a proxy for decompressor 52, effects filter proxy 68 which acts as a proxy for effects filter 54, and sound rendering proxy 70 which acts as a proxy for sound rendering driver 58. Thus, in one aspect, a feature of the present invention is to provide a user mode proxy filter for a kernel mode filter. Certain embodiments of the present invention may therefore comprise means for forming a user mode proxy filter adapted to proxy a kernel mode filter. In FIG. 3, reader proxy filter 64, decompressor proxy filter 66, effects proxy filter 68, and sound rendering proxy 70 are all examples of such a means.

Adding proxy filters for kernel mode filters provides several key benefits. For example, as explained in greater detail below, controlling agent 44 may manipulate and communicate with a particular kernel mode filter simply by manipulating or communicating with its proxy. Thus, user mode proxies of kernel mode filters allow a robust, familiar interface to be presented to a particular controlling agent while, simultaneously, allowing the controlling agent to take advantage of all the benefits of a kernel mode streaming architecture. Depending on the exact implementation, controlling agent 44 may still have to be modified somewhat to take advantage of particular features of various filters. However, even in these cases, the mechanism used to take advantage of such features can be based on familiar protocols and technologies. This allows particular implementation details to be hidden to a greater or lesser degree depending on the particular implementation and the particular details of a particular kernel mode filter.

Operation of the filter graph illustrated in FIG. 3 occurs essentially like the operation of the filter graph presented in FIG. 2. Disk driver 48 extracts data from disk 46 under the direction of reader driver 50. Reader driver 50 passes data to decompressor 52, which decompresses the data and forwards it to effects filter 54. Effects filter 54 uses effects processor 56 to add desired effects and forwards the data to sound rendering driver 58. Sound rendering driver 58 controls sound card 60 so that the data is rendered and played over speaker 62. Thus, in operation the filter graph of FIG. 3 works substantially like the filter graph of FIG. 2 and has all of the benefits of the filter graph of FIG. 2.

Differences occur only in the way controlling agent 44 interacts with the kernel mode filter graph. Rather than deal directly with the individual kernel mode filters as was required in FIG. 2, controlling agent 44 can now interact with the individual kernel mode filters via the corresponding proxy filters. Thus, in situations where proxy filters send notifications to controlling agent 44, such notifications may be passed through the corresponding proxy filter rather than via whatever mechanism is used by the filter graph of FIG. 2. Similarly, when controlling agent 44 configures the filter graph in FIG. 3, all such configurations may be achieved through manipulation of a corresponding proxy filter. For example, when constructing the kernel mode filter graph of FIG. 3, controlling agent 44 would connect the corresponding proxy filters and the corresponding proxy filters would handle the details of connecting the individual kernel mode filters into the desired filter graph. Thus, from the viewpoint of controlling agent 44, a user mode filter graph, analogous to that of FIG. 1 is presented. This is indicated in FIG. 3 by the dashed connections 72 between individual proxy filters. Such connections may be thought of as virtual connections, since from the standpoint of controlling agent 44 the user mode proxy filters are connected so that data may flow between them. In some implementations, an actual connection may exist between individual proxy filters. Such connections may be useful for allowing exchange of information between the proxy filters as necessary to make an interconnection of corresponding kernel mode filters. Other reasons may exist to have similar sorts of information connections. However, no data that is processed by the filter graph located in the kernel mode is exchanged between individual proxy filters.

A wide variety of technologies may be utilized to implement the proxy filters of the present invention. Which technology is selected will depend largely upon the particular operating environment and upon the goals of the developer. For example, custom filter graphs may be constructed and optimized for a single particular purpose such as teleconferencing between two computer stations. Such a specialized filter graph may require customized kernel mode filters adapted specifically to that particular application. However, it is presently envisioned that individual kernel mode filters will have wide applicability and utility in a variety of applications. For example, many filters needed to process audio data for multimedia may also be applicable to teleconferencing. Thus, the concepts of this invention have utility in a wide array of applications and extend well beyond the field of multimedia. Thus, although multimedia examples are typically used throughout this application to illustrate various applications of the present invention, such examples should not be construed as limiting of the scope of this invention.

The present invention may have particular applicability in a generalized multimedia environment. One such environment where the present invention may have particular applicability is in Microsoft's ActiveMovie product. ActiveMovie is a cross-platform digital video technology that allows developers and professionals to create multimedia products. ActiveMovie provides a comprehensive set of services for play back of multimedia information. ActiveMovie's flexible architecture is based on a system of replaceable filters that allows tool and content developers to construct filter graphs to process various types of data. User mode proxy filters of the present invention may be constructed as ActiveMovie filters in order to integrate into the ActiveMovie environment. This will allow a product like ActiveMovie to take advantage of kernel mode filters while maintaining consistency with previously developed user mode filters.

Figure 4:
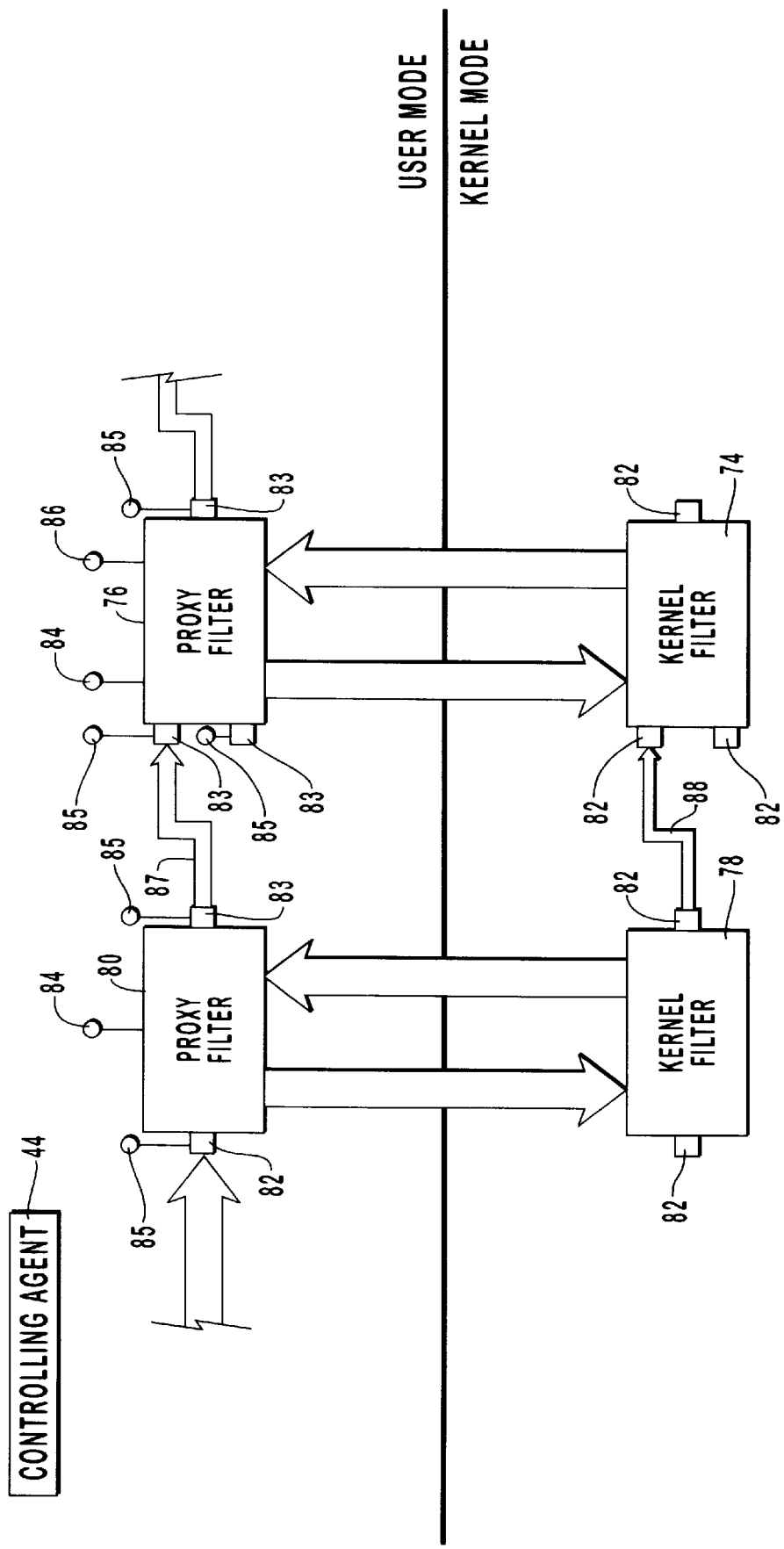
FIG. 4 is a diagram illustrating one method of connecting kernel mode filters by connecting the corresponding user mode proxy filters.

FIG. 4 presents the process of interconnecting two kernel mode filters using corresponding proxy filters in greater detail. In FIG. 4, kernel mode filter 74 has user mode proxy filter 76, and kernel mode filter 78 has user mode proxy filter 80. As illustrated in FIG. 4, kernel mode filter 74 and kernel mode filter 78 comprise a plurality of "pins" 82. A pin is a connection point where a kernel mode filter may be connected to another kernel mode filter. By interconnecting the pins of two kernel mode filters, a data flow path is created that allows data to flow from one kernel mode filter to another. Interconnecting the pins of kernel mode filters is how the filter graph illustrated in FIG. 2 is constructed.

In FIG. 4, the connection process is under the control of controlling agent 44. Thus, controlling agent 44 actually forms the interconnection illustrated between kernel mode filter 74 and kernel mode filter 78. Such a connection, however, is performed via proxy filter 76 and proxy filter 80. If controlling agent 44 is to be able to access functionality within kernel mode filter 74 and kernel mode filter 78, corresponding proxy filters 76 and 80 must provide a mechanism to allow controlling agent 44 to access the functionality of their corresponding kernel mode filter. Embodiments within the scope of this invention therefore comprise means for providing access for a client process to functionality of a kernel mode filter. In other words, proxy filters should provide access to particular functionality of a kernel mode filter in appropriate circumstances. Obviously the degree of access that needs to be provided will depend on the particular function of a kernel mode filter and the type of graph the filter is connected into. At a minimum, however, a proxy filter should provide the ability to connect the kernel mode filter to another kernel mode filter.

In FIG. 4, the means for providing access are illustrated by interface 84 and interface 86. Interface 84 and interface 86 are general representations of a mechanism to access the functionality of a kernel mode filter through a proxy filter. How the interface actually functions and the details of such an interface will depend largely on what technology is used to implement the proxy filters and the corresponding kernel mode filters. Many different technologies may be used to implement these components. For example, such components can be constructed from discrete software entities that reside in a system. As an example, drivers that currently reside in the kernels of many operating systems are simply sections of code that provide functions that can be called by a client process. It is presently preferred, however, to implement user mode proxy filters using Microsoft's Component Object Model (COM) technology. Microsoft's COM technology is closely related to a wide variety of fundamental technologies including OLE and ActiveX. The fundamentals of COM and how the technology relates to ActiveX and OLE can be found in Understanding ActiveX and OLE by David Chappell published by Microsoft Press, incorporated herein by reference.

Microsoft's COM technology has become an industry standard and is well known to those of skill in the art. In essence, however, COM defines a mechanism whereby discrete software units may be combined and extended on a binary level at run time. As explained in greater detail below, such a technology is ideally suited to implement certain aspects of this invention. According to the COM standard, software entities referred to as COM objects define one or more interfaces which provide access to the functionality within the COM object. Mechanisms exist for one COM object to obtain and expose the interfaces of another COM object so that the two COM objects appear to a client process as a single object with the combined functionality of both. Mechanisms also exist to allow one COM object to use the functionality of another COM object without exposing any additional interfaces to a client process. In essence, COM interfaces provides a series of functions, sometimes referred to as methods, that can be activated or called by a client process in order to access particular functionality of the COM object.

Returning now to FIG. 4, if user mode proxy filter 76 and user mode proxy filter 80 are implemented using COM technology, then interface 84 and interface 86 may be an interface according to the COM standard. These interfaces may be accessed by controlling agent 44 in order to manipulate kernel mode filter 74 and kernel mode filter 78.

In one particular implementation of the present invention, a process such as the following may be used to interconnect kernel mode filter 74 and kernel mode filter 78. In this embodiment proxy filter 76 will have information that allows controlling agent 44 to identify the pins of kernel filters 74. Such information may be stored within proxy filter 76 or proxy filter 76 may be configured to incorporate user mode pins corresponding to the pins of kernel filter 74 so that controlling agent 44 sees proxy filter 76 as having the same two input pins and single output pin as kernel mode filter 74. In FIG. 4, proxy filter 76 is configured with pins 83, each corresponding to a pin 82 of kernel filter 74. Pins 83 may also be implemented using COM technology. If pins 83 are COM objects, then each pin may expose one or more interfaces, such as interface 85 shown in FIG. 4. Such interfaces may also be an example of means for providing access to functionality of a kernel mode filter. Note that although all pins and their interfaces in FIG. 4 are identified by common numbers, each pin may be of a different type and each may expose different interfaces. The process of configuring a proxy filter with pins is discussed in greater detail below. Proxy filter 80 may be configured similarly with a single input pin 83 and single output pin 83 corresponding to pins 82 of kernel mode filter 78.

Pin information may be provided, for example, by one of the interfaces exposed by both proxy filter 76 and proxy filter 80. In FIG. 4, interface 84 is implemented by both proxy filter 76 and proxy filter 80. Thus, functions may be provided on interface 84 that allow controlling agent 44 to discover the pins of proxy filter 76 and proxy filter 80. Controlling agent 44 may then interconnect the appropriate filter pins of proxy filter 76 and proxy filter 80 using a protocol understood by controlling agent 44. This is illustrated in FIG. 4 by interconnection 87. In response to this interconnection, proxy filter 76 and proxy filter 80 may respond by interconnecting kernel mode filter 74 and kernel mode filter 78 at the specified pins. Note that the protocol used to connect kernel mode filter 74 and kernel mode filter 78 may be dramatically different than the protocol used by controlling agent 44 to interconnect proxy filter 76 with proxy filter 80. Furthermore, implementations may be defined were the interconnection between kernel filter 74 and kernel filter 78 is performed by one of the proxy filters or by both of the proxy filters. Such implementation details depend solely on the protocol used by controlling agent 44 to interconnect proxy filter 76 and proxy filter 80 and how that protocol is translated to the appropriate protocol to interconnect kernel filter 74 and kernel filter 78.

From the above description, it is apparent that embodiments within the scope of this invention that receive direction from a controlling agent to interconnect with another proxy filter and, in response, interconnect to kernel mode filters, include a means for connecting a pin of one kernel mode filter to another kernel mode filter. Such a means can be any mechanism used by one or more proxy filters to translate a received command into the appropriate protocol needed to interconnect two kernel mode filters. All that is important from the standpoint of this invention is that the user mode controlling agent be able to interconnect two kernel mode filters by using a defined protocol to interconnect two user mode proxy filters. In FIG. 4, such a mechanism may be illustrated by interconnection 87 of proxy filter 76 and proxy filter 80, or by kernel filter connection 88, which shows the ultimate result. Interconnecting kernel mode filters together may, in turn, actually interconnect other devices, systems, or software components such as hardware devices or components, remote machines, or proxies on a remote machine.

Although the present invention provides many benefits and advantages as previously discussed, one drawback to the invention is the general architecture where user mode proxy filters exist for each kernel mode filter. Thus, a provider of kernel mode filters may be placed in the position of providing not only a kernel mode filter, but also a user mode proxy filter if the kernel mode filter is to be used as described herein.

Figure 5:
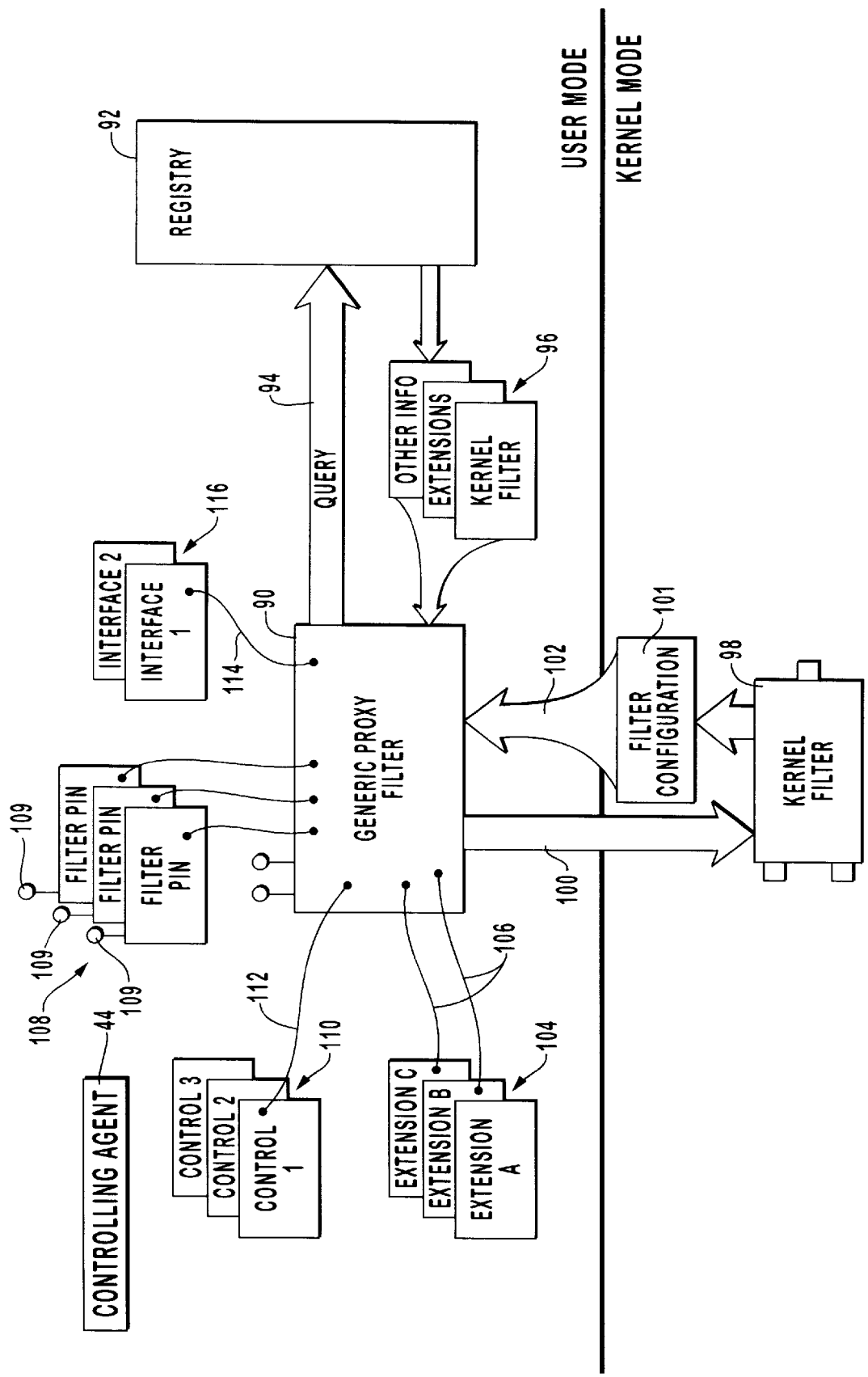
FIG. 5 is a diagram illustrating one way of configuring of a generic proxy filter to proxy a particular kernel filter.

It is undesirable to place the provider of a kernel mode filter in the position of needing to provide a user mode proxy filter. Many providers of kernel mode filters have considerably less expertise in drafting user mode software components. It would, therefore, be highly desirable to allow the provider of a kernel mode filter to take advantage of user mode proxies without the need to craft each user mode proxy from scratch. Such a goal can be achieved by providing a basic generic user mode proxy filter that can be reconfigured and extended through various mechanisms to be able to proxy a wide range of different kernel mode filters. Since the COM standard provides for extensibility of existing software COM objects at run time, such a technology is ideally suited to implement such a generic proxy filter. Referring next to FIG. 5, a summary diagram of a generic proxy filter and the configuration and extension of that filter to adapt it for a particular kernel mode filter is presented. If a generic user mode proxy filter is to be adapted and extended in order to work with a particular kernel mode filter, such a proxy filter needs a means for modifying the user mode proxy filter to match a particular kernel mode filter. The mechanisms and concepts discussed in connection with FIG. 5 are some examples of such means for modifying.

In FIG. 5, the process of modifying a generic proxy filter begins when an instance of the generic proxy filter is created or obtained. When the generic proxy filter is implemented using a COM object, the COM standard defines how a client process, such as controlling agent 44 obtains or creates an instance of a COM object. In essence, the creation of a specifically adapted user mode proxy filter begins first by creating the generic proxy filter and then adapting or configuring the generic proxy filter for a particular kernel mode filter.

In FIG. 5, the created instance of a generic proxy filter is illustrated by generic proxy filter 90. Once generic proxy filter 90 has been created, generic proxy filter 90 must undertake steps to identify how it should be configured and then modify or adapt itself to a particular kernel filter. Many ways may be used to achieve this reconfiguration and the process presented and discussed below should be considered only as exemplary and not limiting of the scope of this invention. The discussion which follows will draw heavily on the ways in which the COM standard performs certain functions.

After generic proxy filter 90 is created, generic proxy filter 90 must uncover certain information necessary to configure itself. Although such information may be obtained in a wide variety of ways, as for example being passed from the controlling agent, it is generally preferred that such information be stored in a defined location where it may be retrieved by generic proxy filter 90. In FIG. 5, such a location is illustrated by registry 92. Registry 92 may be the location where all information needed by the COM standard is stored. Typically, registry 92 will be the system registry. In FIG. 5, the process of obtaining the required information from registry 92 is illustrated by query 94 and response 96. As illustrated in FIG. 5, information in the registry may include the kernel filter that will be proxied by generic proxy filter 90, the extensions that should be incorporated into generic proxy filter 90, and other information as required.

Although the registry may be used to store any information needed by generic proxy filter 90 to configure itself, it is preferred that certain information be obtained directly from the kernel mode filter that will be proxied. For example, the number and type of pins on the kernel mode filter, as well as other configuration parameters, may be obtained directly from the filter. This is illustrated in FIG. 5 by filter configuration parameters 101. As another alternative, all such information may be stored in the registry 92 and obtained through query 94. As yet another alternative, the default filter configuration may be obtained directly from kernel filter 98 while any configuration parameters that are to be overridden can be obtained from registry 92.

When information is to be obtained directly from the kernel mode filter, generic proxy filter 90 may retrieve the identity and location of the kernel filter from the registry as previously indicated. Generic proxy filter 90 may then open or access the identified kernel mode filter. This is illustrated in FIG. 5 by kernel mode filter 98 and connections 100 and 102. If generic proxy filter 90 is to obtain information from kernel mode filter 98, generic proxy filter 90 must comprise means for querying kernel mode filter 98 in order to obtain information about the filter. Connections 100 and 102 are examples of such a means. Any mechanism that allows kernel mode filter 98 and generic proxy filter 90 to communicate appropriate information can be used. For example, in a messaging-based architecture, generic proxy filter 90 and kernel filter 98 may communicate by exchanging messages. In other types of architectures, kernel filter 98 may provide access or entry points that can be called like functions by generic proxy filter 90. The underlying mechanism for communication and exchange of information between generic proxy filter 90 and kernel filter 98 will be dictated primarily, if not exclusively, by the operating environment and operating system of the computer.

As discussed in greater detail below, in some situations generic proxy filter 90 may not contain all the functionality required by kernel mode filter 98 in order to behave as an appropriate user mode proxy filter. In such a situation, the capabilities of generic proxy filter 90 may need to be extended via one or more extensions. In FIG. 5, such extensions are represented by extensions 104. Extensions 104 can be used to provide additional capability to generic proxy filter 90 when they are incorporated into generic proxy filter 90. Thus, if generic proxy filter 90 is to be extended in this way, generic proxy filter 90 must include a means for incorporating extensions into itself. An example process of how such incorporation takes place is described in greater detail below. However, such a means is illustrated in FIG. 5 by links 106.

As previously discussed, in some embodiments it may be desirable to incorporate one or more user mode pins into generic proxy filter 90 that correspond to one or more pins on the corresponding kernel mode filter. In FIG. 5, such user mode filter pins are illustrated by filter pins 108. Filter pins 108 may be implemented using COM objects as indicated by interfaces 109. Generic proxy filter 90 may then create instances of filter pins 108, configure the individual pins as necessary to match corresponding pins in kernel filter 98, and then incorporate the configured filter pins into itself. In such an embodiment, filter pins 108 and proxy filter object 90 have a close relationship where the filter pins do not exist apart from the proxy filter. In some sense, proxy filter 90 can be thought of as a container that holds or contains pins 108. When COM technology is not used as the basis for generic proxy filter 90, other mechanisms may be used to configure generic proxy filter 90 with the appropriate user mode filter pins. Any process used to obtain or configure generic proxy object 90 with filter pins is an example of means for creating user mode pins.

Certain types of kernel filters have various parameters or properties that can be modified or set to change the behavior of the kernel mode filter. For example, a kernel mode filter that mixes two channels may include balance parameter that represents the relative volume level of each input channel. Other types of filters may have any number of different types of parameters that can be modified. This gives rise to a situation where it is desirable to configure generic proxy filter 90 with the ability to manipulate such parameters or properties in order to modify how kernel mode filter 98 functions. For certain classes of filters, such controls are fairly standard. For example, it is common for audio data to have a location where the volume may be set. Similarly, video has certain standard parameters such as color, tint, contrast, brightness, and so forth. It may be possible to create generic proxy filter 90 with all such standard controls as an integral part of the proxy filter. However, such an approach generally leads to an increased size for generic proxy filter 90. It is generally better, therefore, to create a structure whereby generic proxy filter 90 can incorporate controls as required. Thus, if a kernel mode filter needs a volume control, then such a volume control may be incorporated into generic proxy filter 90. If a volume control is not needed, then such a control need not be incorporated therein. In FIG. 5, the controls that can be incorporated into generic proxy filter 90 are illustrated by controls 110. As used herein, the term "control" refers to a software component that performs common tasks in standard ways. Thus, such controls can be used for setting parameters as previously described. In one embodiment, controls 110 represent ActiveX controls. ActiveX controls are software components based on COM technology that perform standard functions in a standard way. Such controls are also used within the ActiveMovie product and many standardized controls for performing functions such as setting the volume, brightness, and so forth are available.

The ability to incorporate such controls into generic proxy filter 90 can create significant advantages. For example, if the provider of kernel mode filter 98 requires a certain type of control and if a standard control exists that performs the desired function, then the provider of kernel filter 98 may obtain and utilize such a control simply by creating kernel mode filter 98 to the defined standard. When generic proxy filter 90 is adapted to connect to kernel filter 98, the appropriate control can be incorporated into generic proxy filter 90. Thus, the provider of a kernel mode filter receives the benefit of a control without ever expending the time and effort to create one.

If controls are incorporated into generic proxy filter 90, generic proxy filter 90 must include means for incorporating a control therein. In FIG. 5, such means is illustrated by link 112. Means for incorporating controls into generic proxy filter 90 may be implemented using any mechanism that allows such incorporation. If generic proxy filter 90 is implemented using COM technology, and if controls 110 are based on either ActiveX or COM technology, then such means for incorporating can be the standard mechanism used by COM objects to access ActiveX controls or other COM objects like aggregation or containment. Although such terms are familiar to those skilled in the art, essentially aggregation is a process whereby one COM object obtains an instance of another COM object and then exposes the interfaces of the obtained COM object to client processes. This allows both COM objects to appear as if they were a single aggregated COM object. Containment is essentially the same process except that the interfaces on the obtained object are not exposed but are simply held and used internally. If generic proxy filter 90 is constructed using some other technology, then other types of mechanisms may be utilized such as run time linking of code similar to the way a dynamic link library is loaded or any number of technologies that have been developed in order to allow run time incorporation of one software component into another software component.

When controls are incorporated into generic proxy filter 90, translation may need to be performed in order to take the information from the control and place it in condition to be received by kernel filter 98. Although this concept is explained in greater detail in conjunction with FIG. 7 below, in some sense controls 110 can be thought of as taking information received in user mode and translating it to a format suitable for use with kernel filter 98. The information received by controls 110 may be from any source such as controlling agent 44 or from a user interface as explained below.

Occasionally, it is highly desirable to allow a user to configure parameters or properties then affect the functioning of a kernel mode filter. For example, it is highly desirable to allow a user to adjust the volume of a filter graph adapted for processing audio data. If a user is to adjust the volume, a user interface must exist that retrieves input from a user and eventually transfers the information to the kernel mode filter where the volume is adjusted. Embodiments within the scope of this invention may therefore comprise means for incorporating a user interface. In FIG. 5, such means is represented by link 114 which links one of user interfaces 116 into generic proxy object 90. Any mechanism may be used to incorporate user interfaces into generic proxy object 90. Again, the exact choice will depend on the technology used to implement generic proxy filter 90. As explained in greater detail below, COM technology provides a mechanism whereby a kernel mode filter or a control can specify which user interface should be used to gather input from a user. Such a user interface can then be incorporated into the generic proxy filter in a manner that allows data to be gathered from a user, passed to the appropriate control, and eventually transferred to the kernel filter. One method of incorporating user interfaces into a user mode proxy filter is discussed in greater detail below.

Once generic proxy filter 90 has been configured with all appropriate extensions, controls, filter pins, user interfaces, and any other characteristics necessary to adapt generic proxy filter 90 to kernel mode filter 98, the process of configuration is complete. When generic proxy filter 90 is identifying which of these type of components should be incorporated in order to adapt itself to a particular kernel mode filter, the information about which components should be included may come from a variety of sources. For example, all such information may be stored in the registry in a manner that lets generic proxy filter 90 identify the components and incorporate them. In the alternative, some information may be stored in the registry while other information may be obtained from kernel mode filter 98 or even some of the other components themselves. For example, once generic proxy filter 90 obtains the identity and location of kernel mode filter 98, kernel mode filter 98 can identify any additional extensions, controls, pins, or user interfaces. In one embodiment, the identity and location of kernel filter 98 along with the extensions, are obtained from registry 92 while the filter pins and other configuration parameters are obtained from the kernel filter 98. Entries in registry 92 may also be used to override and settings received from kernel filter 98. In these embodiments, kernel mode filter 98 only identifies a portion of this information. It does not matter where such configuration information comes from as long as generic proxy filter 90 is able to obtain sufficient information to allow it to configure itself properly.

As a final point, if filter pins 108 are implemented using COM technology, other configuration options become possible. For example, using COM technology facilitates aggregation of controls or extensions directly onto the filter pins instead of the filter itself. In such an embodiment it would be possible to aggregate a separate volume control directly onto two pins of a mixer. Such an approach opens up entirely new and different configurations for user mode proxy filters. Using such an architecture allows any of the controls or extensions in FIG. 5 to be aggregated onto a pin instead of a filter. Also note that there may be times when it is desirable or necessary to configure a user mode proxy filter slightly different than from its kernel mode counterpart. For example, a user mode proxy filter may have a different number or type of pins in order to ensure compatibility with a particular controlling agent. As another example, it may be desirable to aggregate controls or other extensions onto the pins of a user mode proxy filter in a manner that causes the pins of the user mode proxy filter to be different from the kernel mode filter. Any configuration differences can be handled by the proxy filter in the way that it interfaces with the kernel filter.

Although the above description has focused on the initial configuration of a generic proxy filter, similar procedures may be used to dynamically reconfigure a user mode proxy filter to match any configuration changes of a corresponding kernel mode filter. A technology that supports dynamic reconfiguration of a user mode proxy filter is Microsoft's COM technology, previously described.

Figure 6:
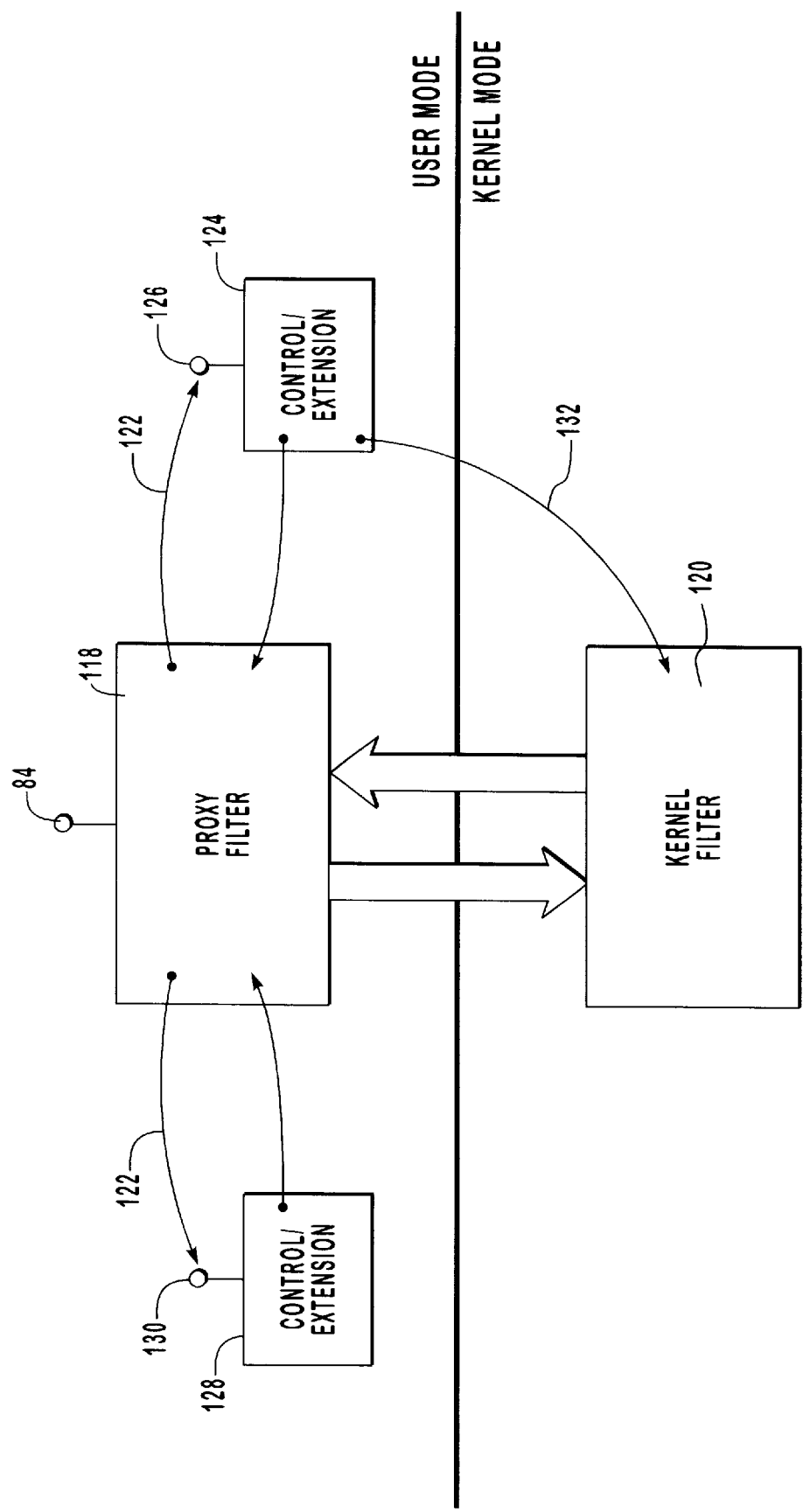
FIG. 6 is a diagram illustrating an example of how extensions may be incorporated into a user mode proxy filter.

Referring next to FIG. 6, extension of a proxy filter is discussed in greater detail. In FIG. 6, user mode proxy filter 118 acts as a proxy for kernel mode filter 120. User mode proxy filter 118 may be a generic proxy filter, such as generic proxy filter 90 of FIG. 5, or may be a non-generic proxy filter that simply needs to be extended to access or expose all the capability of kernel mode filter 120. In one embodiment, certain extensions may be incorporated into proxy filter 118 by defining one or more "hook points" in proxy filter 118. Each hook point represents a location where an extension may be incorporated. Typically such hook points are defined when proxy filter 118 is developed. Such hook points are usually placed in locations where it is difficult or impossible to know how future kernel mode filters may behave. For example, in order to connect two kernel mode filters together, each kernel mode filter must process the same type of data. In other words, it would generally be inappropriate to connect a filter processing video data to a filter expecting audio data. Some filters may accept a variety of different types of data. Other filters may produce a variety of different data types. For example, a splitter filter may accept a data stream of combined audio and video data and separate the audio data into one channel and the video data into another channel. Similarly, a mixer may accept audio data at one pin and video data at another pin and produce a combined audio and video stream.

Because the data type expected or produced must be identified before a kernel mode filter is connected to another filter, one of the functions typically performed by a proxy filter, such as user mode proxy filter 118, is to perform type checking on a kernel mode filter, such as kernel mode filter 120. When proxy filter 118 is developed, proxy filter 118 can be configured to check kernel filter 120 for all known data types. However, if a data type is defined after proxy filter 118 has been developed, or in other situations, it may not be possible to rely on the code placed in proxy filter 118 to check kernel filter 120. Such a situation is ideal for an extension which can include the latest data types or other information necessary to identify the data types used by kernel mode filter 120. By placing a hook point in proxy filter 118 at the location where data type is checked, proxy filter 118 can incorporate into that point an extension that overrides the default behavior of proxy filter 118. In essence, these hook points are nothing more than a mechanism to transfer execution from proxy filter 118 at a particular location to a particular extension. After the extension has performed the desired function, control can then be returned to the proxy filter.

The process of transferring control to an extension is illustrated in FIG. 6 by link 122. Link 122 represents yet another example of means for incorporating an extension or control into a proxy filter. If a control or extension incorporated into proxy filter 18 is a COM object, the functionality of the control or extension may be accessed or exposed through an interface. Such a situation is represented in FIG. 6 where control or extension 124 is accessed through interface 126 and control or extension 128 is accessed through interface 130. In FIG. 6 no distinction is made between a control or extension because the same mechanism may be used to incorporate either into proxy filter 118. For purposes of discussion, the distinction between a control or extension is largely or wholly irrelevant.

Focusing now on control or extension 124, when control or extension 124 is accessed by proxy filter 118 through interface 126, control or extension 124 may, in turn, access kernel filter 120. In FIG. 6 this is represented by link 132. As represented by this link, if proxy filter 118 does not allow access to functionality of kernel filter 120 that provider of a kernel filter wishes to be exposed, the provider of a kernel mode filter may also provide an appropriate extension or control and then incorporate the extension or control into the proxy filter using an appropriate mechanism. The proxy filter, or a controlling agent may then access the functionality through the control or extension provided or expose such functionality to client processes. If proxy filter 118 is a COM object and if the control or extension is a COM object, then the proxy filter can aggregate the control or extension into itself and expose any interfaces on the control or extension to a controlling agent.

Controls or extensions may also be provided that do not access the underlying kernel filter. This situation is represented in FIG. 6 by control or extension 128. Sometimes, a control or extension may not need to access the underlying functionality of the kernel filter. For example, it is conceivable that when a kernel mode filter is developed all information regarding the data types supported by that filter will be known. In order to provide adequate type check capability, the provider of the kernel mode filter may also provide an extension that is hooked into proxy filter 118. This extension may be preprogrammed to return the known type information when activated by proxy filter 118. In such a situation, the extension does not need to access the underlying kernel filter in order to provide the appropriate information to proxy filter 118.

Extensions incorporated into a user mode proxy filter as described above may perform any number of functions. Examples of some of the functions they may provide are given above. As one further example, extensions may perform a translation function. Although the filter graph of FIG. 3 shows all data processing being performed in kernel mode, it is conceivable that filter graphs may be created that also include one or more user mode filters that do not proxy a kernel mode filter. In such a filter graph it may be necessary to provide translation of an interface connecting to a user mode filter to an interface connecting to a kernel mode filter, or visa versa.

Figure 7:
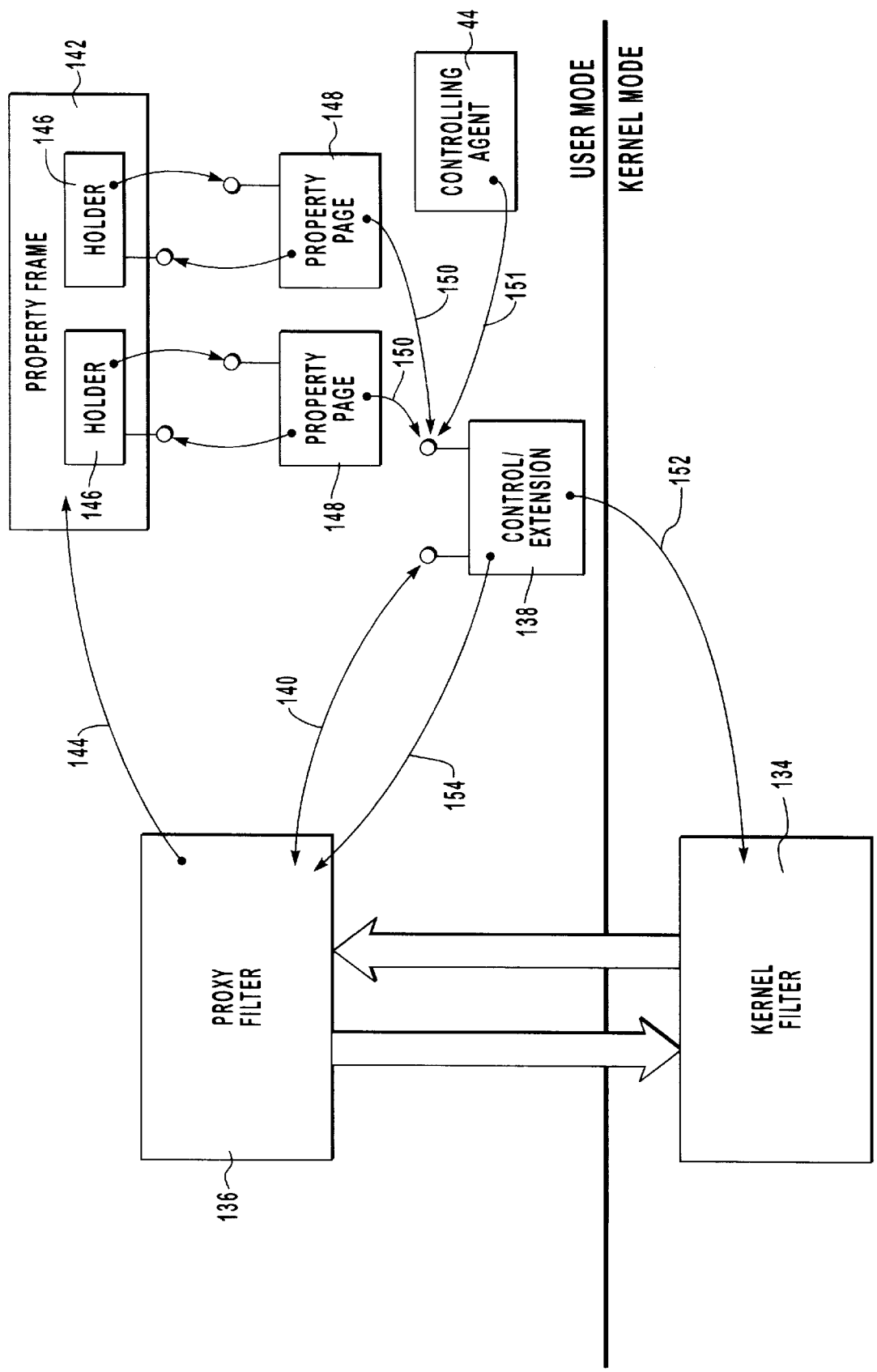
FIG. 7 is a diagram illustrating an example of how user interfaces may be incorporated into a user mode proxy filter.

Referring now to FIG. 7, one mechanism for incorporating a user interface into a proxy filter is discussed in greater detail. In FIG. 7, kernel mode filter 134 is proxied by user mode proxy filter 136. In the example illustrated in FIG. 7, it is presumed that kernel mode filter 134 has various properties that can be modified in order to modify the operation of the kernel mode filter. Furthermore, it is presumed that such properties can be modified by control or extension 138. In such a situation, control or extension 138 may be provided by the developer of kernel filter 134 or may be a standard control or extension such as those previously discussed. Control or extension 138 is incorporated into proxy filter 136 as previously described.

According to one aspect of the present invention, if COM technology is used to implement control or extension 138, control or extension 138 may inform proxy filter 136 the user interface that should be used to gather input from a user. ActiveX controls, for example, contain a specific function that, when called by a client process, returns the user interface or user interfaces that can be used to gather input from the user and transfer the input to the control.

COM technology provides a defined way of identifying the user interface preferred by a particular control and collecting information from the user interface and passing the collected information to the control. The example in FIG. 7 illustrates how this process is accomplished. Adopting the terminology of Microsoft Windows®, the user interface components will be identified as property pages. Those familiar with Microsoft Windows® will be familiar with the tabbed dialog boxes of property pages used by that operating system to collect specific information and set certain properties. Referring now to FIG. 7, the process begins by proxy filter 136 querying control or extension 138 for the property pages it desires. Such a query and response is identified by link 140. Proxy filter 136 may then create property frame 142 which is used to hold and display the individual property pages. This process is illustrated in FIG. 7 by link 144. Property frame 142 may have a holder object for each property page that will be displayed. In FIG. 7 these holder objects are represented by holders 146. Property frame 142 then obtains an instance of the desired property pages 148. The entire dialog box may then be assembled and displayed to the user and information collected from the user. As the property pages collect information, such information may be passed to control 138 as illustrated by links 150. Control or extension 138 may then transfer the information to kernel mode filter 134 as illustrated by link 152 or to user mode proxy filter 136 as indicated by link 154. This entire process represents but one example a means for incorporating a user interface into a user mode proxy filter. Although this discussion has been presented primarily from the viewpoint of using COM technology, other mechanisms using different technology may also exist. What is important is the ability of proxy filter 136 to identify user interfaces and incorporate those user interfaces into the user mode proxy filter so that data can be gathered from a user and used to modify the parameters of a kernel mode filter.

As previously discussed in conjunction with FIG. 5, when a control collects information from a user mode source, such as property page 148, translation or reformatting of data may need to occur to place the data in the proper format for kernel filter 134. Functionally, control 138 can be thought of as a translator that converts received user mode data to a format understandable to kernel mode filter 134. Control 138 can take any data received through the proper interface and pass it to kernel filter 134. Thus, in some embodiments data may also come from sources other than property page 148. This is illustrated in FIG. 7 by controlling agent 44 passing data to control 138 as illustrated by arrow 151. Allowing controlling agent 44 to pass data to control 138 may be helpful, for example, for automated payback of scripted multimedia shows.

Figure 8:
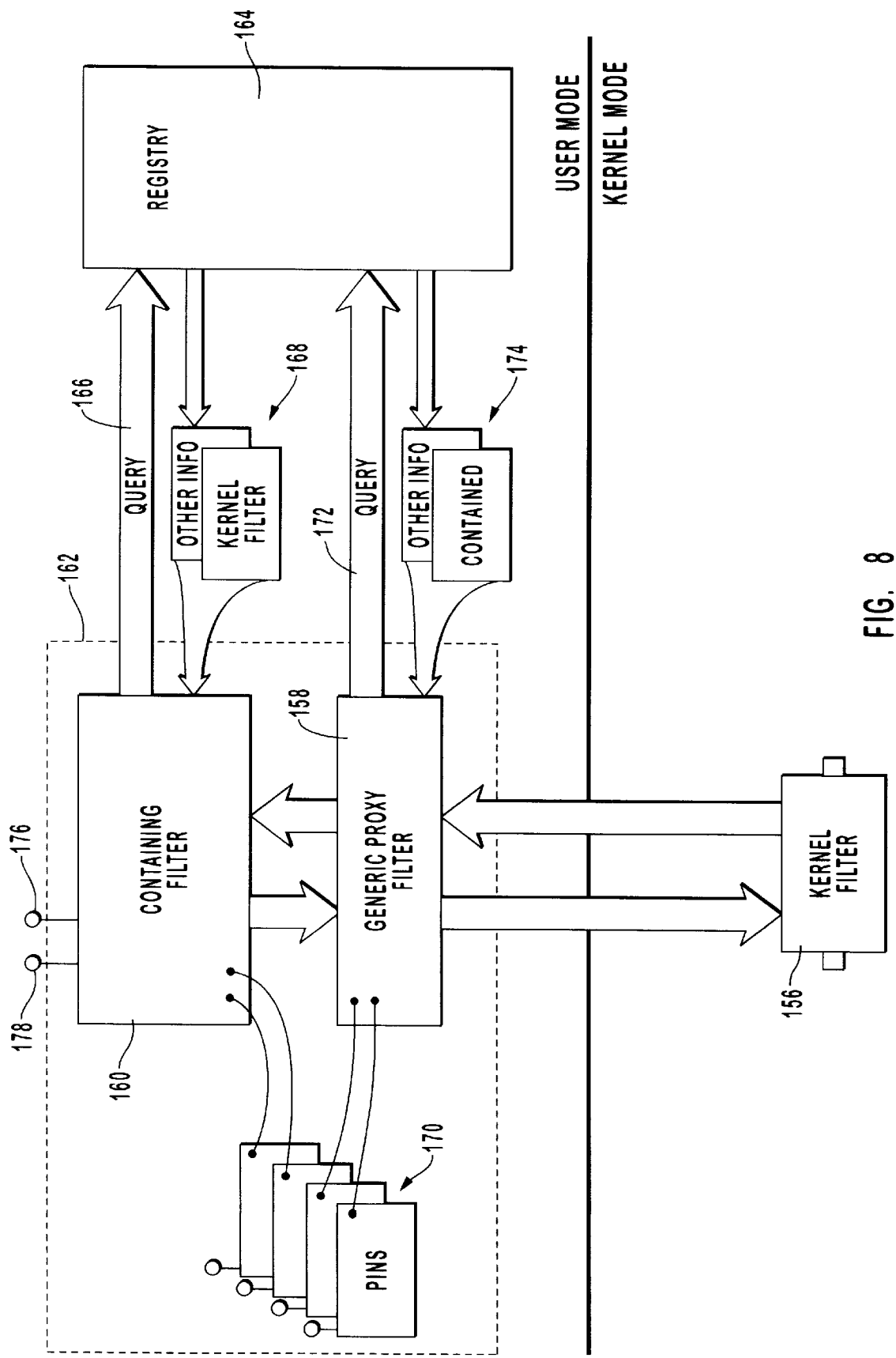
FIG. 8 is a diagram illustrating extension of a generic user mode proxy filter by containment.

Turning now to FIG. 8, another example of means for modifying a user mode proxy filter to work with a particular kernel mode filter is illustrated. As previously discussed, COM technology provides two mechanisms for extension of COM objects. One mechanism is aggregation and the other mechanism is containment. FIG. 8 illustrates how principles of containment can be used to modify and extend a generic proxy filter so that the generic proxy filter is adapted to proxy a specific kernel mode filter.

In FIG. 8, kernel mode filter 156 is proxied by a combination of generic proxy filter 158 and containing filter 160. It is important to note that in this situation it is the combination of containing filter 160 and generic proxy filter 158 that provides the user mode proxy for kernel mode filter 156. This is indicated in FIG. 8 by dashed box 162.

The general concept of containment is that generic proxy filter 158 performs some functions useful for proxying kernel mode filter 156, but additional extension is needed that cannot be provided through a simpler mechanism, such as the hooking of extensions as previously described. In such a situation, a second filter is written that wraps or contains the generic proxy filter and adds additional capability and functionality not found within the generic proxy filter. In FIG. 8, this results in containing filter 160 calling specific functionality from generic proxy filter 158 as necessary but adding additional functionality where required. In the containment model used by COM, any interfaces of generic proxy filter 158 would not be exposed to a client process through containing filter 160. Containing filter 160 would, rather, present its own interfaces to a client process, such as a controlling agent as previously discussed. In FIG. 8, containing filter 160 is shown as communicating with kernel mode filter 156 only through generic proxy filter 158. In some embodiments containing filter 160 may also communicate directly with kernel mode filter 156.

The process of creating the combined proxy filter may proceed in a number of ways. The process described below is but one example. In this example, when a client process, such as a controlling agent, wishes to create a user mode proxy, the client process would begin by creating an instance of containing filter 160. Containing filter 160 would retrieve specific information from registry 164 as illustrated by query 166 and response 168. As indicated in FIG. 8, one piece of information that may be retrieved is the identity and location of kernel mode filter 156. Additional information may also be retrieved from registry 164 such as the number and type of pins available on kernel filter 156. Alternatively, such information may be retrieved from kernel mode filter 156 directly.

Since containing filter 160 will use an instance of the generic proxy filter to provide a number of functions, containing filter 160 will create an instance of a generic proxy filter, as illustrated by generic proxy filter 158. When created, generic proxy filter 158 will retrieve information from registry 164 as indicated by query 172 and response 174. As illustrated in FIG. 8, one piece of information retrieved by generic proxy filter 158 from registry 164 is the contained flag. This flag informs generic proxy filter 158 that it is being contained by another filter and not acting as a stand alone filter. Such a flag may be used to override certain types of behavior, such as the behavior illustrated and discussed in conjunction with FIGS. 5 and 6.

Once generic proxy filter 158 has been created, containing filter 160 can use generic proxy filter 158 to open kernel mode filter 156 and retrieve information about kernel mode filter 156. It should be noted that because containing filter 160 is controlling generic proxy filter 158, containing filter 160 may pass the filter name of kernel mode filter 156 to generic proxy filter 158. Thus, containing filter 160 can determine which kernel mode filter is open by generic proxy filter 158. Generic proxy filter 158 and containing filter 160 can retrieve information from kernel mode filter 156 regarding the type and number of pins on the filter. Generic proxy filter 158 and containing filter 160 may then create user mode pins 170 and incorporate such pins into themselves as previously discussed. Again pins 170 are illustrated in FIG. 8 as separate COM objects. A client process, such as a controlling agent, may access the functionality of the combined user mode proxy filter through a particular mechanism such as interfaces 176 and 178 or the interfaces on pins 170, if exposed to the controlling agent.

Specific embodiments may utilize a containment mechanism as illustrated in FIG. 8 or any of the incorporation mechanisms illustrated in FIG. 5 to extend and adapt a generic proxy filter to a particular kernel mode filter. Some embodiments may implement only a portion of the identified mechanisms. Other embodiments may implement all of the identified mechanisms. The exact method or mechanism used to extend a particular generic proxy filter will depend in large part on the specific type of technology used to implement the generic proxy filter.

With the advent of streaming architectures in kernel mode, it is now possible to have multiple filter graphs with one or more filter graphs residing wholly or primarily in user mode and one or more other filter graphs residing wholly or primarily in kernel mode. This creates a situation where filter graphs in kernel mode may need to be synchronized with filter graphs in user mode. Filter graphs in user mode receive time from user mode clocks and filter graphs in kernel mode receive time from kernel mode clocks. Thus, mechanisms must be put in place to allow the synchronization of user mode clocks and kernel mode clocks in order to allow synchronization of user mode filter graphs and kernel mode filter graphs. Throughout this discussion the term "clock" is to be construed broadly. As used herein, this term includes any component that provides time to filters. Thus, a component that generates time as well as a component that receives time from another component and then makes it available are both within the scope of the term clock.

Figure 9:
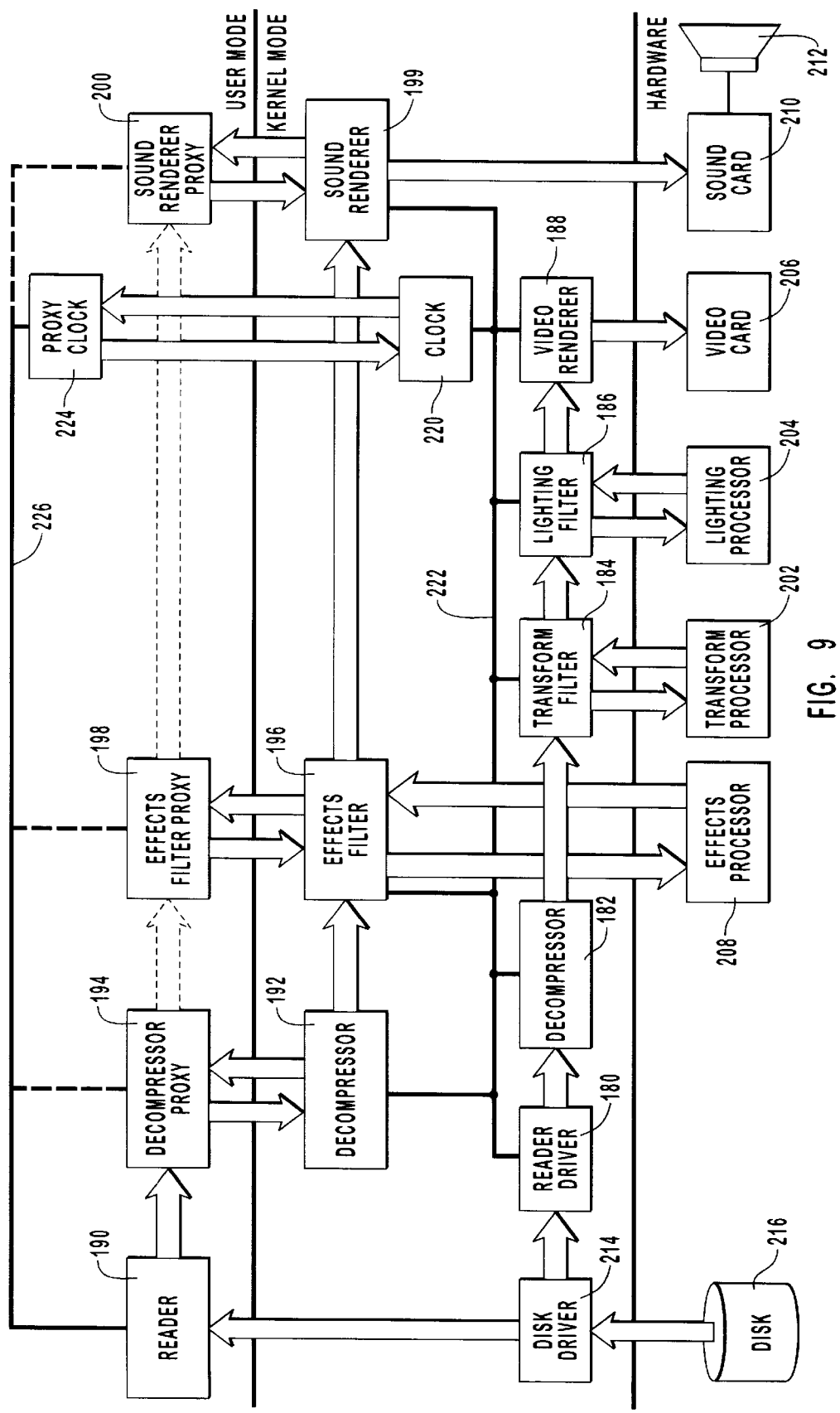
FIG. 9 is a diagram illustrating one embodiment for synchronization of two filter graphs with a kernel mode master clock.

Referring first to FIG. 9, a representation of two filter graphs that must be synchronized is presented. As discussed below, one filter graph processes video data and the other filter graph processes audio data. The filter graph processing video data resides wholly within kernel mode. Such a filter graph may be constructed according to the patents previously incorporated by reference. The audio filter graph, on the other hand, operates primarily in kernel mode but has a single user mode filter and a plurality of kernel mode filters proxied by user mode proxy filters.

The kernel mode filter graph processing video data comprises reader driver 180, decompressor 182, transform filter 184, lighting filter 186, and video renderer 188. The audio filter graph comprises user mode reader 190, kernel mode decompressor 192 and its accompanying user mode proxy 194, kernel mode effects filter 196 and its accompanying proxy effects filter proxy 198, and sound renderer 199 with its accompanying proxy 200. Transform processor 202 is used by transform filter 184 as necessary to complete its function, and lighting processor 204 is used by lighting filter 186 to accomplish its function. As indicated in FIG. 9, video renderer 188 renders the video data to video card 206. Effects processor 208 is used by effects filter 196 as necessary, and sound renderer 199 renders sound information to sound card 210, which is played by speaker 212. Disk driver 214 extracts information from disk 216 under the control of reader 190 for audio data and under the control of reader driver 180 for video data.

In the two processing graphs of FIG. 9, it is presumed that a kernel mode clock is to be chosen as the master clock. Thus, in FIG. 9 kernel mode clock 220 is presumed to be the master clock. Kernel mode clock 220 may provide timing information to all kernel mode filters. In FIG. 9, this is illustrated by distribution line 222. User mode filters, on the other hand, receive information from a user mode clock. In order to provide timing information to user mode filters, a user mode proxy may be established for kernel mode clock 220. In FIG. 9, such a proxy is illustrated by user mode proxy clock 224. When a kernel mode clock is selected as the master clock, then the principles previously discussed in relation to user mode proxy of kernel mode filters may be applied to create a user mode proxy clock. Such a user mode proxy clock may retrieve timing information from a master kernel mode clock and then provide such timing information to user mode filters. In FIG. 9, user mode proxy clock 224 retrieves timing information from master kernel mode clock 220 and makes such timing information available to user mode filters that require it. Thus, distribution line 226 provides timing information to reader 190. 17 In FIG. 9, decompressor proxy 194, effects filter proxy 198, and sound renderer proxy 200 are connected to distribution line 226 by dashed lines. This is to indicate that such proxy filters may not need to retrieve timing information from proxy clock 224. While in some embodiments, such filters may need to retrieve timing information from proxy clock 224, in other embodiments, such timing information may be provided by the corresponding kernel mode filter. In the alternative, it may also be possible for user mode proxy filters to retrieve timing information from a user mode clock, such as proxy clock 224, and then forward such timing information to the corresponding kernel mode filter. Thus, in FIG. 9 user mode proxy clock 224 is but one example of a means for providing a user mode clock that forms a proxy for a kernel mode clock. Other mechanisms may also exist to provide equivalent functionality.

In some embodiments, there may be differences between the way that kernel mode clocks and user mode clocks keep time. For example, ActiveMovie clocks continue to run even when the media stream has been paused. Some implementations of kernel mode clocks, however, pause when the media stream is paused. Thus, in some embodiments it may be necessary to perform a time translation between a kernel mode clock and a user mode clock. Such a situation will arise when a user mode clock, such as proxy clock 224 of FIG. 9, is used to feed an ActiveMovie filter graph which expects the time to continue to run even when the media stream is paused. In such a situation, if kernel mode clock 220 pauses when the media stream is paused but proxy clock 224 must continue to run when the media is paused, proxy clock 224 should include a means for translating kernel mode time into an appropriate user mode time. If the master kernel mode clock 220 pauses when the media stream is paused, then user mode proxy clock 224 must contain a mechanism to keep the clock running even though kernel mode clock 220 has been stopped. When kernel mode clock 220 resumes operation, user mode proxy clock 224 must then translate the kernel mode time into user mode time. This may be as simple as adding the time of the pause to the kernel mode clock time. Mechanisms may also need to be put in place to correct for any clock drift that occurs between either a kernel mode clock and a user mode clock or between a kernel mode clock, a user mode clock, and a master system time such as a hardware clock from the computer system.

When a media stream is paused and then restarted, other problems may also arise. For example, filter devices do not generally stop or start immediately. Thus, when a command is given to a filter device to begin running, a short delay may occur before the device actually begins. Furthermore, a similar phenomenon may occur when a device is commanded to stop running. Clocks on the other hand, tend to start and stop virtually instantaneously. It may, therefore, be necessary to "bump" a clock by either speeding the clock up or slowing the clock down in order to account for the delays in starting and stopping filter devices. Such bumping is preferably done by either slowing down the clock for a short period, or by speeding up the clock for short period. It is preferable that time not move backwards or jump discontinuously. Time stamps in media data can be used to help bring a clock into alignment with media time.

It should be noted that this clock "bumping" example has been given in the context of ActiveMovie. There is nothing in the invention that requires such a result. When the invention is used in other contexts, there may be no need to bump a clock to bring it into alignment. Clock proxies can be developed which remain synchronized without bumping.

Figure 10:
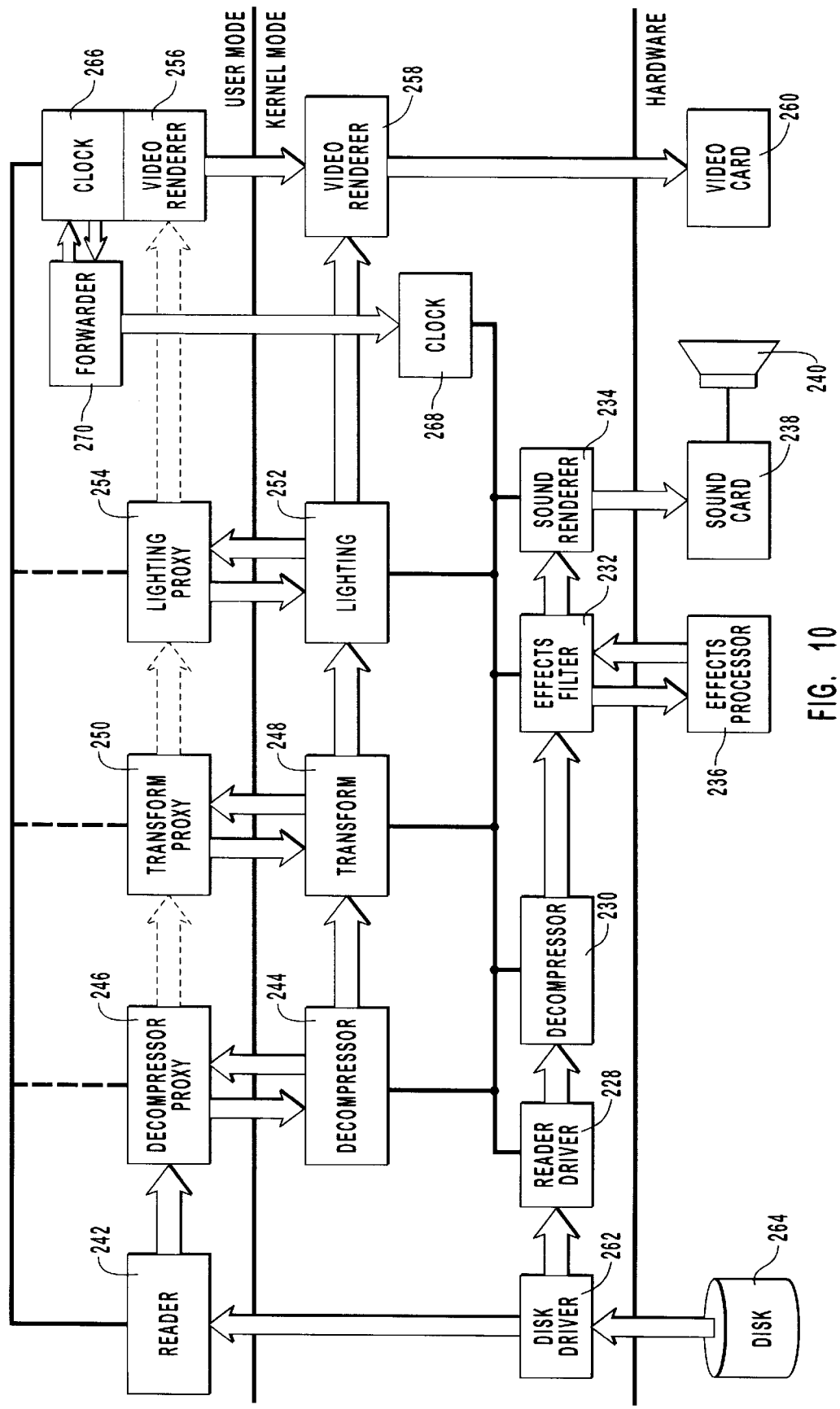
FIG. 10 is a diagram illustrating an example of synchronization of two filter graphs with a user mode master clock.

Referring now to FIG. 10, an example is presented where a user mode filter graph is the master, and a kernel mode filter graph is slaved to the user mode filter graph. In FIG. 10, the kernel mode filter graph comprises reader driver 228, decompressor 230, effects filter 232, and sound renderer 234. As before, effects filter 232 utilizes an effect processor 236 and sound renderer 234 transfers information to sound card 238 so that it can be played on speaker 240.

The user mode filter graph comprises user mode reader 242, decompressor 244 and its accompanying proxy 246, transform filter 248 and its accompanying proxy 250, lighting filter 252 and its accompanying proxy 254, and user mode video renderer 256 and kernel mode video renderer 258. Kernel mode video renderer 258 passes video information to video card 260 for display to a user. As before, disk driver 262 retrieves information from disk 264 under the control of reader 242 and reader driver 228.

In FIG. 10, user mode clock 266 is selected as the master clock, and kernel mode clock 268 is selected as the slave clock. Since timing information must be transferred from user mode clock 266 to kernel mode clock 268, embodiments may comprise means for forwarding time information from a user mode clock to a kernel mode clock. In FIG. 10, such a means is illustrated by forwarder 270. Forwarder 270 may obtain timing information from clock 266 and forward or pass such information to clock 268. Clock 268 may then provide timing information to kernel mode filters while clock 266 may provide timing information to user mode filters. Forwarder 270 represents but one example of a means of forwarding time information to a kernel mode clock and other mechanisms may also be used. For example, clock 266 may be adapted to directly forward timing information 268. In the alternative, forwarder 270 may become part of a user mode proxy, such as clock proxy 224 of FIG. 9. In such a case, timing information would flow from the user mode proxy into the kernel mode clock rather than the other way as presented in FIG. 9.

Essentially, all that is necessary for the present invention is the ability to synchronize a slave clock with a master clock. Any of the technologies currently available to synchronize two clocks may be used with beneficial effect in the present invention. Other considerations, however, may dictate modifications to such current methods. The timing translation between a clock that pauses when the media stream pauses and a clock that doesn't is but one example of such considerations.

The examples illustrated in FIGS. 9 and 10 only show a single user mode clock and a single kernel mode clock. In some filter graphs, however, there may be more than one clock in the user mode and/or the kernel mode. In these filter graphs, the same principles illustrated in FIGS. 9 and 10 are applicable. A master clock is selected and the other user mode and kernel mode clocks are synchronized using the principles shown in FIGS. 9 and 10. In fact, selecting a kernel mode clock may allow synchronization between different user mode filter graphs. Because kernel mode objects can be commonly available to multiple user mode processes, a master kernel mode clock may be used to synchronize multiple user mode filter graphs. In certain environments, the ability to easily synchronize the clocks of multiple user mode filter graphs may be important.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of synchronizing the processing of a data stream in kernel mode with the processing of a data stream in user mode, said method comprising the steps of:

connecting a plurality of kernel mode filters together to form a kernel mode processing graph adapted to process data by first processing data in one of said plurality of kernel mode filters and then passing the processed data to another of said plurality of kernel mode filters so that data is processed in turn by each of said plurality of kernel mode filters, wherein pins of at least two of said plurality of kernel mode filters are connected together in response to a client process interconnecting corresponding user mode pins of user mode proxy filters that operate in user mode and correspond to said at least two of said plurality of kernel mode filters;

creating a kernel mode clock that allows said plurality of kernel mode filters in said kernel mode processing graph to identify the time;

connecting a plurality of user mode filters together to form a user mode processing graph adapted to process data by first processing data in one of said plurality of user mode filters and then passing the processed data to another of said plurality of user mode filters so that data is processed by each of said plurality of user mode filters in said user mode processing graph;

creating a user mode clock that allows said plurality of user mode filters in said user mode processing graph to identify the time; and selecting one of either said user mode clock or said kernel mode clock to be a master clock and selecting the other of said user mode clock or said kernel mode clock to be a slave clock and then synchronizing the slave clock to the master clock so that said kernel mode processing graph and said user mode processing graph are synchronized.

2. A method of synchronizing the processing of a data stream in kernel mode with the processing of a data stream in user mode as recited in claim 1 further comprising the step of creating a forwarder when said user mode clock has been selected as the master clock, said forwarder operating to obtain the current time from the master clock and forward the current time to the slave clock so that the kernel mode clock obtains the current time from said forwarder.

3. A method of synchronizing the processing of a data stream in kernel mode with the processing of a data stream in user mode as recited in claim 1 further comprising the step of proxying said kernel mode clock with said user mode clock when said kernel mode clock has been selected as the master clock, wherein said user mode clock obtains the current time from said kernel mode clock.

4. A computer-readable medium having computer-executable instructions for performing the steps recited in claim 1.

5. A method as recited in claim 1, further comprising the step of processing the data stream using the kernel mode processing graph.

6. A method as recited in claim 1, further comprising the step of processing the data stream using the user mode processing graph.

7. A method as recited in claim 1, further comprising the steps of:

processing the data stream using a subset of the user mode filters included in the user mode processing graph;

using one of the subset of the user mode filters to transmit the data stream across a security boundary separating the user mode and the kernel mode to one of the kernel mode filters included in a subset of the kernel mode filters of the kernel mode processing graph; and processing the data stream using the subset of the kernel mode filters of the kernel mode processing graph.

8. A method of using user mode proxy filters to connect together two corresponding kernel mode filters in a kernel mode filter graph, each kernel mode filter being adapted for processing data, in order to allow data to directly flow between the connected kernel mode filters without passing through user mode, said method comprising the steps of:

creating a connection between a first user mode proxy filter and a first kernel mode filter so that configuration of said first kernel mode filter in said kernel mode filter graph can be achieved by a client process manipulating said first proxy filter;

creating a connection between a second user mode proxy filter and a second kernel mode filter so that configuration of said second kernel mode filter in said kernel mode filter graph can be achieved by said client process manipulating said second proxy filter;

said client process interconnecting said first user mode proxy filter and said second user mode proxy filter using a defined procedure to create a user mode interconnection, said user mode interconnection being virtual in that said user mode interconnection appears to be an actual interconnection from the standpoint of the client process although data that is processed by the kernel mode filter graph does not flow over the user mode interconnection; and said first user mode proxy filter and said second user mode proxy filter responding to said user mode interconnection by establishing a corresponding kernel mode interconnection representing at least a portion of said kernel mode filter graph, said kernel mode inter connection being made between said first kernel mode filter and said second kernel mode filter so that data can flow directly between said first kernel mode filter and said second kernel mode filter without passing between said first user mode proxy filter and said second user mode proxy filter.

9. A computer-readable medium having computer-executable instructions for performing the steps recited in claim 8.

10. A method of using user mode proxy filters to connect together two corresponding kernel mode filters in a kernel mode filter graph, each kernel mode filter being adapted for processing data, in order to allow data to directly flow between the connected kernel mode filters without passing through user mode, said method comprising the steps of:

creating an instance of a first user mode proxy filter and forming a connection between said first user mode proxy filter and a first kernel mode filter so that configuration of said first kernel mode filter in said kernel mode filter graph can be achieved by a client process manipulating said first proxy filter, said first kernel mode filter having at least one pin forming a connection point where said first kernel mode filter can be connected to another kernel mode filter, said first user mode proxy filter having at least one user mode pin corresponding to said at least one pin on said first kernel mode filter;

creating an instance of a second user mode proxy filter and forming a connection between said second user mode proxy filter and a second kernel mode filter so that configuration of said second kernel mode filter in said kernel mode filter graph can be achieved by said client process manipulating said second proxy filter, said second kernel mode filter having at least one other pin forming a connection point where said second kernel mode filter can be connected to another kernel mode filter, said second user mode proxy filter having at least one other user mode pin corresponding to said at least one other pin; and said client process interconnecting said at least one user mode pin of said first user mode proxy filter and said at least one other user mode pin of said second user mode proxy filter using a defined procedure to create a user mode interconnection, said user mode interconnection being virtual in that said user mode interconnection appears to be an actual interconnection from the standpoint of the client process although data that is processed by the kernel mode filter graph does not flow over the user mode interconnection; and said first user mode proxy filter and said second user mode proxy filter responding to said user mode interconnection by establishing a corresponding kernel mode interconnection representing at least a portion of said kernel mode filter graph, said kernel mode interconnection being made between said at least one pin of said first kernel mode filter and said at least one other pin of said second kernel mode filter so that data can flow directly between said at least one pin of said first kernel mode filter and said at least one other pin of said second kernel mode filter without passing between said first user mode proxy filter and said second user mode proxy filter.

11. A computer-readable medium having computer-executable instructions comprising:

means for forming a user mode proxy filter adapted to proxy a kernel mode filter having at least one pin that defines a connection point where said kernel mode filter can be connected to another kernel mode filter, said user mode proxy filter comprising:

means for enabling a client process to configure said kernel mode filter by manipulating said user mode proxy filter, without said client process accessing said kernel mode filter directly; and means for connecting said at least one pin of said kernel mode filter to a designated kernel mode filter in response to a connection request from said client process so that data can flow between said kernel mode filter and said designated kernel mode filter, said connection request comprising said client process directing said user mode proxy filter to connect a user mode pin of said user mode proxy filter to a user mode pin of another user mode proxy filter to create a user mode interconnection, said user mode interconnection being virtual in that said user mode interconnection appears to be an actual interconnection from the standpoint of the client process although data that is transmitted between said kernel mode filter and said designated kernel mode filter does not flow over the user mode interconnection.

12. A computer-readable medium as recited in claim 11 wherein said user mode proxy filter further comprises means for modifying said user mode proxy filter to match said kernel mode filter so that said user mode proxy filter takes on different characteristics depending on the characteristics of said kernel mode filter.

13. A computer-readable medium as recited in claim 12 wherein said means for modifying said user mode proxy filter comprises means for incorporating at least one extension into said user mode proxy filter, said at least one extension being adapted to access specific functionality in said kernel mode filter thereby allowing said user mode proxy filter to access said specific functionality through said at least one extension.

14. A computer-readable medium as recited in claim 12 wherein said means for modifying said user mode proxy filter comprises means for incorporating at least one extension into said user mode proxy filter, said at least one extension being adapted to expose specific functionality in said kernel mode filter to another process so that said exposed functionality can be accessed by said another process through said user mode proxy.

15. A computer-readable medium as recited in claim 12 wherein said means for modifying said user mode proxy filter comprises means for incorporating at least one control adapted to access and modify operation of said kernel mode filter by modifying at least one property of said kernel mode filter.

16. A computer-readable medium as recited in claim 15 wherein said means for modifying said user mode proxy filter comprises means for identifying a user interface adapted to receive input from a user and transfer said received input to said at least one control so that said at least one property in said kernel mode filter is modified in response to received input from said user.

17. A computer-readable medium as recited in claim 12 having further executable instructions comprising means for querying said kernel mode filter in order to discover information about said kernel mode filter.

18. A computer-readable medium as recited in claim 17 wherein said means for modifying said user mode proxy filter is further adapted for modifying said user mode proxy filter based on information discovered through said means for querying.

* * * * *

UNITED STATES PATENT AND TRADEMARK OFFICE
CERTIFICATE OF CORRECTION

PATENT NO.   : 6,212,574 B1
DATED        : April 3, 2001
INVENTOR(S)  : Thomas J. O'Rourke, George H.J. Shaw and Bryan A. Woodruff Page 1 of 1

It is certified that error appears in the above-identified patent and that said Letters Patent is hereby corrected as shown below:

Column 6,
Line 43, before "depict only" change "drawing" to -- drawings --

Column 7,
Line 43, after "different filters" change "of" to -- that --

Column 13,
Line 52, after "defined" change "were" to -- where --

Column 17,
Line 36, after "properties" change "then" to -- that --

Column 23,
Line 49, after "reader 190." delete "17"

Column 27,
Line 20, after "kernel mode" change "inter connection" to -- interconnection --

Signed and Sealed this

Thirtieth Day of April, 2002

Attest:

JAMES E. ROGAN
*Attesting Officer*       *Director of the United States Patent and Trademark Office*